United States Patent
Raghavan et al.

(10) Patent No.: US 11,871,394 B2
(45) Date of Patent: Jan. 9, 2024

(54) TECHNIQUES FOR INDICATING PREFERRED BEAMS IN DUAL-CONNECTIVITY/CARRIER-AGGREGATION (DC-CA) SYSTEMS BASED ON DEFAULT OPERATING FREQUENCY MISMATCH

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 134 days.

(21) Appl. No.: 17/497,316

(22) Filed: Oct. 8, 2021

(65) Prior Publication Data

US 2022/0167333 A1 May 26, 2022

Related U.S. Application Data

(60) Provisional application No. 63/118,150, filed on Nov. 25, 2020.

(51) Int. Cl.
*H04W 72/04* (2023.01)
*H04W 72/044* (2023.01)
*H04B 7/022* (2017.01)

(52) U.S. Cl.
CPC .......... *H04W 72/046* (2013.01); *H04B 7/022* (2013.01)

(58) Field of Classification Search
CPC ............... H04W 72/046; H04W 16/28; H04W 72/1289; H04W 72/04; H04W 72/12;
(Continued)

(56) References Cited

U.S. PATENT DOCUMENTS

| 2019/0021096 A1* | 1/2019 | Nilsson | ................. H04W 8/005 |
| 2020/0044310 A1* | 2/2020 | Ben Rached | ........ H04B 7/0691 |

(Continued)

FOREIGN PATENT DOCUMENTS

| EP | 3531596 A1 * | 8/2019 | .......... H04B 7/0626 |
| JP | 2016039432 A | 3/2016 | |

(Continued)

OTHER PUBLICATIONS

International Search Report and Written Opinion—PCT/US2021/054363—ISA/EPO—dated Apr. 25, 2022.
(Continued)

*Primary Examiner* — Mewale A Ambaye
(74) *Attorney, Agent, or Firm* — Holland & Hart LLP

(57) ABSTRACT

This disclosure provides systems, methods and apparatuses, including computer programs encoded on computer storage media, for a selection of a set of beams that a first cell or a second cell, or both, may use to communicate with a user equipment (UE) within a carrier-aggregation (CA) or dual-connectivity (DC) deployment. In one aspect, the UE may transmit an indication of the selected set of beams based on a mismatch between a default operating frequency (DOF) of antenna ports of each cell and antenna modules of the UE. For example, the UE may receive an indication of a DOF of each antenna port of the first cell and the second cell and the UE may compare the indicated DOFs with a DOF of each antenna module of the UE. The UE may select one or more ports that each cell may use to communicate with the UE based on the comparison.

30 Claims, 9 Drawing Sheets

(58) Field of Classification Search
CPC ...... H04B 7/022; H04B 7/0695; H04B 7/088; H04B 7/04; H04B 7/0691; H04B 7/06; H04B 7/08
See application file for complete search history.

(56) References Cited

U.S. PATENT DOCUMENTS

2020/0350972 A1*  11/2020  Yi ............................ H04L 1/12
2021/0235284 A1*  7/2021   Venugopal ........... H04B 7/0408
2021/0258964 A1*  8/2021   Khoshnevisan ..... H04B 7/0695

FOREIGN PATENT DOCUMENTS

| JP | 2016039432 | * | 9/2019 |
| KR | 20190105035 | * | 2/2018 |
| KR | 20190105035 A | | 9/2019 |

OTHER PUBLICATIONS

Partial International Search Report—PCT/US2021/054363—ISA/EPO—dated Mar. 1, 2022.

* cited by examiner

TECHNIQUES FOR INDICATING PREFERRED BEAMS IN DUAL-CONNECTIVITY/CARRIER-AGGREGATION (DC-CA) SYSTEMS BASED ON DEFAULT OPERATING FREQUENCY MISMATCH

CROSS REFERENCE TO RELATED APPLICATIONS

The present Application for Patent claims the benefit of U.S. Provisional Patent Application No. 63/118,150 by RAGHAVAN et al., entitled "TECHNIQUES FOR INDICATING PREFERRED BEAMS IN DUAL-CONNECTIVITY/CARRIER-AGGREGATION (DC-CA) SYSTEMS BASED ON DEFAULT OPERATING FREQUENCY MISMATCH," filed Nov. 25, 2020, assigned to the assignee hereof, and expressly incorporated by reference herein.

TECHNICAL FIELD

The following relates to wireless communications, including techniques for indicating beams in dual-connectivity/carrier-aggregation (DC-CA) systems based on a default operating frequency (DOF) mismatch.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may communicate with one or more cells in a carrier-aggregation (CA) or a dual-connectivity (DC) deployment.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communications at a user equipment (UE). The method may include receiving an indication of a first default operating frequency (DOF) of one or more cells, the one or more cells operating over a set of multiple bands, transmitting an indication of a set of candidate beams for communicating with the one or more cells based on a mismatch between the first DOF of the one or more cells and a second DOF associated with the UE, receiving an indication of a set of assigned beams for communicating with the one or more cells in response to the transmitted indication of the set of candidate beams, and communicating with the one or more cells over the set of multiple bands using the set of assigned beams.

Another innovative aspect of the subject matter described in this disclosure can be implemented in an apparatus for wireless communications at a UE. The apparatus may include a first interface, a second interface, and a processing system. The first interface may be configured to obtain an indication of a first DOF of one or more cells, the one or more cells operating over a set of multiple bands. The first interface or the second interface may be further configured to output an indication of a set of candidate beams for communicating with the one or more cells based on a mismatch between the first DOF of the one or more cells and a second DOF associated with the UE, obtain an indication of a set of assigned beams for communicating with the one or more cells in response to the transmitted indication of the set of candidate beams, and communicate with the one or more cells over the set of multiple bands using the set of assigned beams.

Another innovative aspect of the subject matter described in this disclosure can be implemented in another apparatus for wireless communications at a UE. The apparatus may include a processor, memory coupled with the processor, and instructions stored in the memory. The instructions may be executable by the processor to cause the apparatus to receive an indication of a first DOF of one or more cells, the one or more cells operating over a set of multiple bands, transmit an indication of a set of candidate beams for communicating with the one or more cells based on a mismatch between the first DOF of the one or more cells and a second DOF associated with the UE, receive an indication of a set of assigned beams for communicating with the one or more cells in response to the transmitted indication of the set of candidate beams, and communicate with the one or more cells over the set of multiple bands using the set of assigned beams.

Another innovative aspect of the subject matter described in this disclosure can be implemented in another apparatus for wireless communications at a UE. The apparatus may include means for receiving an indication of a first DOF of one or more cells, the one or more cells operating over a set of multiple bands, means for transmitting an indication of a set of candidate beams for communicating with the one or more cells based on a mismatch between the first DOF of the one or more cells and a second DOF associated with the UE, means for receiving an indication of a set of assigned beams for communicating with the one or more cells in response to the transmitted indication of the set of candidate beams, and means for communicating with the one or more cells over the set of multiple bands using the set of assigned beams.

Another innovative aspect of the subject matter described in this disclosure can be implemented in a non-transitory computer-readable medium storing code for wireless communications at a UE. The code may include instructions executable by a processor to receive an indication of a first DOF of one or more cells, the one or more cells operating over a set of multiple bands, transmit an indication of a set of candidate beams for communicating with the one or more cells based on a mismatch between the first DOF of the one or more cells and a second DOF associated with the UE, receive an indication of a set of assigned beams for communicating with the one or more cells in response to the transmitted indication of the set of candidate beams, and communicate with the one or more cells over the set of multiple bands using the set of assigned beams.

Another innovative aspect of the subject matter described in this disclosure can be implemented in a method for wireless communications at a first cell. The method may include transmitting, to a UE, an indication of a first DOF of one or more cells, the one or more cells operating over a set of multiple bands, receiving, from the UE, an indication of a set of candidate beams for communicating with the UE based on a mismatch between the first DOF of the one or more cells and a second DOF associated with the UE, transmitting, to the UE, an indication of a set of assigned beams for the UE to communicate with the one or more cells in response to the received indication of the set of candidate beams, and communicating with the UE via at least one of the set of assigned beams using at least one of the set of candidate beams.

Another innovative aspect of the subject matter described in this disclosure can be implemented in an apparatus for wireless communications at a first cell. The apparatus may include a first interface, a second interface, and a processing system. The first interface may be configured to output, to a UE, an indication of a first DOF of one or more cells, the one or more cells operating over a set of multiple bands. The first interface or the second interface may be configured to obtain, from the UE, an indication of a set of candidate beams for communicating with the UE based on a mismatch between the first DOF of the one or more cells and a second DOF associated with the UE, output, to the UE, an indication of a set of assigned beams for the UE to communicate with the one or more cells in response to the received indication of the set of candidate beams, and communicate with the UE via at least one of the set of assigned beams using at least one of the set of candidate beams.

Another innovative aspect of the subject matter described in this disclosure can be implemented in another apparatus for wireless communications at a first cell. The apparatus may include a processor, memory coupled with the processor, and instructions stored in the memory. The instructions may be executable by the processor to cause the apparatus to transmit, to a UE, an indication of a first DOF of one or more cells, the one or more cells operating over a set of multiple bands, receive, from the UE, an indication of a set of candidate beams for communicating with the UE based on a mismatch between the first DOF of the one or more cells and a second DOF associated with the UE, transmit, to the UE, an indication of a set of assigned beams for the UE to communicate with the one or more cells in response to the received indication of the set of candidate beams, and communicate with the UE via at least one of the set of assigned beams using at least one of the set of candidate beams.

Another innovative aspect of the subject matter described in this disclosure can be implemented in another apparatus for wireless communications at a first cell. The apparatus may include means for transmitting, to a UE, an indication of a first DOF of one or more cells, the one or more cells operating over a set of multiple bands, means for receiving, from the UE, an indication of a set of candidate beams for communicating with the UE based on a mismatch between the first DOF of the one or more cells and a second DOF associated with the UE, means for transmitting, to the UE, an indication of a set of assigned beams for the UE to communicate with the one or more cells in response to the received indication of the set of candidate beams, and means for communicating with the UE via at least one of the set of assigned beams using at least one of the set of candidate beams.

Another innovative aspect of the subject matter described in this disclosure can be implemented in a non-transitory computer-readable medium storing code for wireless communications at a first cell. The code may include instructions executable by a processor to transmit, to a UE, an indication of a first DOF of one or more cells, the one or more cells operating over a set of multiple bands, receive, from the UE, an indication of a set of candidate beams for communicating with the UE based on a mismatch between the first DOF of the one or more cells and a second DOF associated with the UE, transmit, to the UE, an indication of a set of assigned beams for the UE to communicate with the one or more cells in response to the received indication of the set of candidate beams, and communicate with the UE via at least one of the set of assigned beams using at least one of the set of candidate beams.

In some implementations, transmitting or receiving the indication of the set of candidate beams, as implemented in the method, apparatuses, and non-transitory computer-readable medium described herein, can include operations, features, means, or instructions for transmitting or receiving the indication of the set of candidate beams based on the mismatch between the first DOF of the one or more cells and the second DOF associated with the UE being within a threshold mismatch.

In some implementations, transmitting or receiving the indication of the set of candidate beams, as implemented in the method, apparatuses, and non-transitory computer-readable medium described herein, can include operations, features, means, or instructions for transmitting or receiving an indication of the mismatch between the first DOF of the one or more cells and the second DOF associated with the UE.

In some implementations, transmitting or receiving the indication of the set of candidate beams, as implemented in the method, apparatuses, and non-transitory computer-readable medium described herein, can include operations, features, means, or instructions for transmitting or receiving the indication of the set of candidate beams based on an out-of-band emission associated with the set of candidate beams satisfying a threshold on out-of-band emissions.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
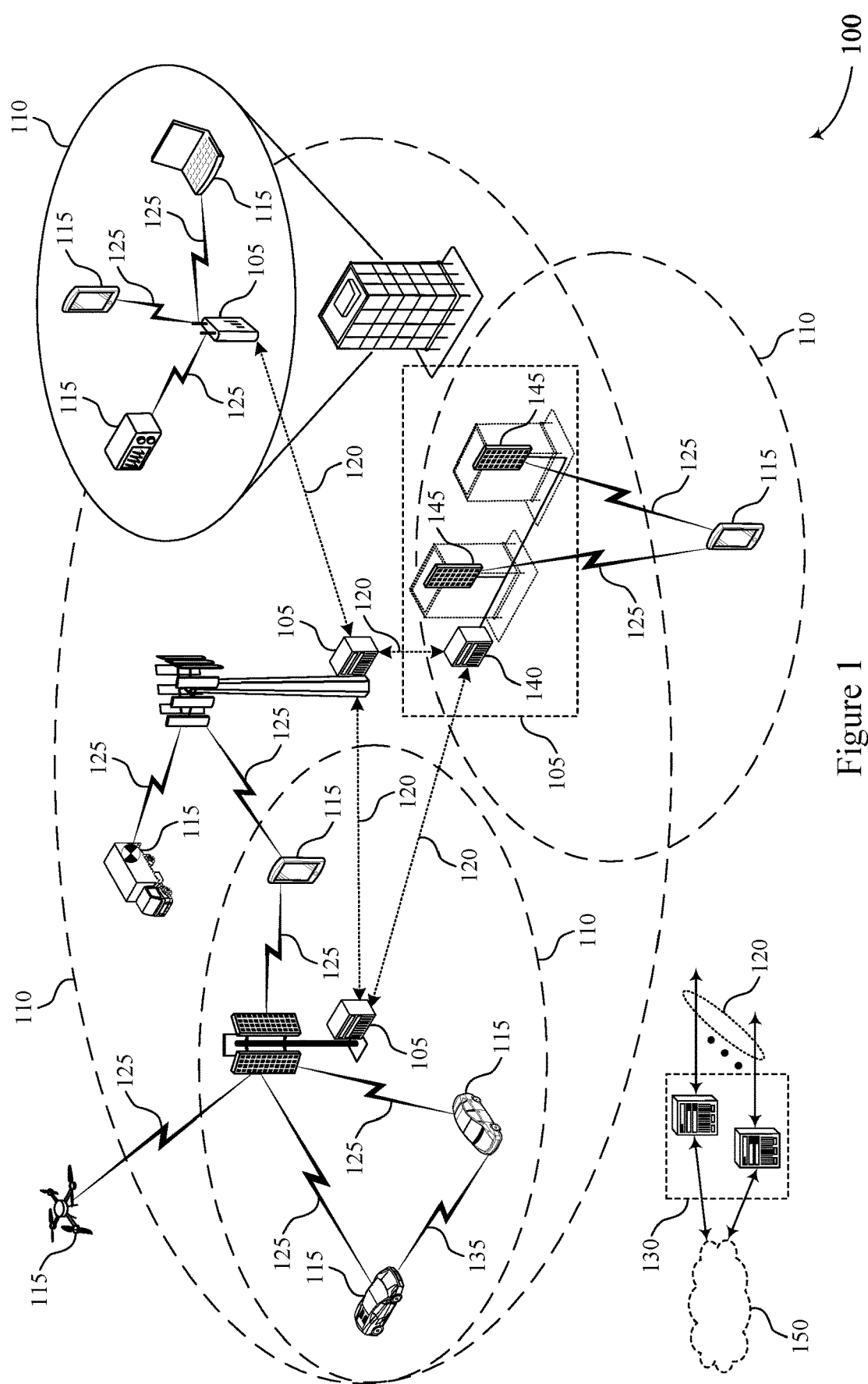
FIGS. 1 and 2 illustrate examples of wireless communications systems that support techniques for indicating beams in dual-connectivity/carrier-aggregation (DC-CA) systems based on a default operating frequency (DOF) mismatch.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (JOT) network, such as a system utilizing 3G, 4G or 5G, or further implementations thereof, technology.

In some wireless communications systems, a UE may communicate with multiple cells in a carrier-aggregation (CA) or a dual-connectivity (DC) deployment. For example, the UE may communicate with at least two cells, including a first cell and a second cell, according to a CA or DC communication technique. In some examples, the UE may communicate with the first cell and the second cell over various radio frequency spectrum bands that support ultra-wide bandwidth operation, such as FR2 (which may include frequencies between 24.25-52.6 GHz) or FR4 (which may include frequencies between 52.6 GHz-114.25 GHz) radio frequency spectrum bands. In such examples, one or more of the UE, the first cell, or the second cell may tune a radio frequency chain of their respective antenna subarrays, panels, ports, or modules to a default operating frequency (DOF). For example, the UE, the first cell, or the second cell may tune or optimize a respective analog or radio frequency beamforming codebook for some carrier frequency within the ultra-wide bandwidth over which the UE, the first cell, and the second cell may communicate. Such a carrier frequency may be referred to herein as a DOF (for example, a frequency for which an antenna array is tuned or optimized relative to other frequencies). Further, the UE, the first cell, or the second cell may configure multiple antenna ports, antenna modules, or antenna elements at the respective device with different DOFs, such that each device may support different DOFs at different antenna ports, antenna modules, or antenna elements.

In some implementations of the present disclosure, the UE may select and indicate a set of beams that the first cell or the second cell, or both, may use to communicate with the UE based on a DOF mismatch between a corresponding antenna port of the first cell or the second cell and at least one antenna module of the UE. For example, the UE may receive, from one or both of the first cell or the second cell, an indication of a DOF of each antenna port of the first cell and the second cell. The UE may select and indicate the set of beams that correspond to (such as, are formed from) an antenna port having a DOF that is within a threshold DOF mismatch of a DOF of an antenna module of the UE. In other words, if the first cell transmits a first beam from a first port having a first DOF that is received at a first antenna module of the UE having a second DOF within the threshold DOF mismatch of the first DOF, the UE may select the first beam for communication between the first cell and the UE and may transmit an indication of the first beam.

In some aspects, the UE may select and indicate the set of beams during a synchronization/initial acquisition or an access or beam refinement procedure with the first cell and the second cell. For example, the UE may receive a number of synchronization signal blocks (SSBs) from the first cell and the second cell via the antenna ports of the first cell and the second cell and, based on the indication of the DOF of each antenna port of the first cell and the second cell and a signal strength of the SSBs at an antenna module of the UE, the UE may identify a set of beams that the first cell and the second cell may use to communicate with the UE. For instance, the UE may receive a first SSB (which may correspond to the first beam) from the first port of the first cell at the first antenna module of the UE, the first port configured with the first DOF and the first antenna module of the UE configured with the second DOF, and if the UE determines that the first DOF and the second DOF are similar (for example, within the threshold DOF mismatch or within a threshold range of each other), the UE may transmit an indication of the first port to indicate to the first cell to use the first beam for communication with the UE. In some implementations, the UE may indicate the first port based on transmitting an indication of a transmission configuration indicator (TCI) state corresponding to the first port.

Particular aspects of the subject matter described in this disclosure can be implemented to realize one or more of the following potential advantages. The described techniques may be implemented to establish more robust and reliable communication links between the UE, the first cell, and the second cell in a CA or DC deployment. For example, based on indicating the set of beams that the first cell and the second cell may use to communicate with the UE based on a DOF mismatch between antenna ports of the first cell and the second cell and antenna modules of the UE, the UE and the first cell or the second cell may communicate using beams formed from antenna ports or modules having similarly tuned radio frequency chains, which may increase the signal strength of communications between the UE and the first cell or the second cell. This increase in signal strength may increase the likelihood for successful communication between the UE and the first cell or the second cell. The UE, the first cell, and the second cell, based on achieving a greater likelihood for successful communication, may experience greater connectivity, higher data rates, increased throughput, or greater spectral efficiency, among other benefits. Further, the described techniques may be implemented to realize greater reliability for CA or DC deployments.

FIG. 1 illustrates an example of a wireless communications system 100 that supports techniques for indicating beams in DC-CA systems based on a DOF mismatch. The wireless communications system 100 may include one or more base stations 105, one or more UEs 115, and a core network 130. In some examples, the wireless communications system 100 may be a Long Term Evolution (LTE)

network, an LTE-Advanced (LTE-A) network, an LTE-A Pro network, or a New Radio (NR) network. In some examples, the wireless communications system 100 may support enhanced broadband communications, ultra-reliable (such as mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (such as core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (such as via an S1, N2, N3, or another interface). The base stations 105 may communicate with one another over the backhaul links 120 (such as via an X2, Xn, or another interface) either directly (such as directly between base stations 105), or indirectly (such as via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (such as a bandwidth part (BWP)) that is operated according to one or more physical layer channels for a given radio access technology (such as LTE, LTE-A, LTE-A Pro, NR). Each physical layer channel may carry acquisition signaling (such as synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (such as in a carrier aggregation configuration), a carrier also may have acquisition signaling or control signaling that coordinates operations for other carriers. A carrier may be associated with a frequency channel (such as an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (such as of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (such as in an FDD mode) or may be configured to carry downlink and uplink communications (such as in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (such as 1.4, 3, 5, 10, 15, 20, 40, or 80 megahertz (MHz)). Devices of the wireless communications system 100 (such as the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (such as a sub-band, a BWP) or all of a carrier bandwidth.

Signal waveforms transmitted over a carrier may be made up of multiple subcarriers (such as using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (such as a duration of one modulation symbol) and one subcarrier, where the symbol period and subcarrier spacing are inversely related. The number of bits carried by each resource element may depend on the modulation scheme (such as the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (such as spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (such as 10 milliseconds (ms)). Each radio frame may be identified by a system frame number (SFN) (such as ranging from 0 to 1023).

Each frame may include multiple consecutively numbered subframes or slots, and each subframe or slot may have the same duration. In some examples, a frame may be divided (such as in the time domain) into subframes, and each subframe may be further divided into a number of slots. Alternatively, each frame may include a variable number of slots, and the number of slots may depend on subcarrier spacing. Each slot may include a number of symbol periods (such as depending on the length of the cyclic prefix prepended to each symbol period). In some wireless communications systems 100, a slot may further be divided into multiple mini-slots containing one or more symbols. Excluding the cyclic prefix, each symbol period may contain one or more (such as $N_f$) sampling periods. The duration of a symbol period may depend on the subcarrier spacing or frequency band of operation.

A subframe, a slot, a mini-slot, or a symbol may be the smallest scheduling unit (such as in the time domain) of the wireless communications system 100 and may be referred to as a transmission time interval (TTI). In some examples, the TTI duration (such as the number of symbol periods in a TTI) may be variable. Additionally, or alternatively, the smallest scheduling unit of the wireless communications system 100 may be dynamically selected (such as in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (such as a control resource set (CORESET)) for a physical control channel may be defined by a number of symbol periods and may extend across the system bandwidth or a subset of the system bandwidth of the carrier. One or more control regions (such as CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (such as control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (such as over a carrier) and may be associated with an identifier for distinguishing neighboring cells (such as a physical cell identifier (PCID), a virtual cell identifier (VCID), or others). In some examples, a cell also may refer to a geographic coverage area 110 or a portion of a geographic coverage area 110 (such as a sector) over which the logical communication entity operates. Such cells may range from smaller areas (such as a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (such as several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (such as licensed, unlicensed) frequency bands as macro cells. Small cells may provide unrestricted access to the UEs 115 with service subscriptions with the network provider or may provide restricted access to the UEs 115 having an association with the small cell (such as the UEs 115 in a closed subscriber group (CSG), the UEs 115 associated with users in a home or office). A base station 105 may support one or multiple cells and also may support communications over the one or more cells using one or multiple component carriers.

In some examples, a carrier may support multiple cells, and different cells may be configured according to different protocol types (such as MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In some other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (such as via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (such as a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (such as according to narrowband communications), or a combination of these techniques. For example, some UEs 115 may be configured for operation using a narrowband protocol type that is associated with a defined portion or range (such as set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (such as mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 also may be able to communicate directly with other UEs 115 over a device-to-device (D2D) communication link 135 (such as using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1-M) system in which each UE 115 transmits to every other UE 115 in the group. In some examples, a base station 105 facilitates the scheduling of resources for D2D communications. In other some other examples, D2D communications are carried out between the UEs 115 without the involvement of a base station 105.

In some systems, the D2D communication link 135 may be an example of a communication channel, such as a sidelink communication channel, between vehicles (such as UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (such as base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (such as a mobility management entity (MME), an access and mobility management function (AMF)) and at least one user plane entity that routes packets or interconnects to external networks (such as a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (such as radio heads and ANCs) or consolidated into a single network device (such as a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (such as less than 100 kilometers) compared to transmission using the smaller frequencies and longer waves of the high frequency (HF) or very high frequency (VHF) portion of the spectrum below 300 MHz.

The wireless communications system 100 also may operate in a super high frequency (SHF) region using frequency bands from 3 GHz to 30 GHz, also known as the centimeter band, or in an extremely high frequency (EHF) region of the spectrum (such as from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (such as LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (such as the same codeword) or different data streams (such as different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which also may be referred to as spatial filtering, directional transmission, or directional reception, is a signal processing technique that may be used at a transmitting device or a receiving device (such as a base station 105, a UE 115) to shape or steer an antenna beam (such as a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (such as antenna panels) to conduct beamforming operations for directional communications with a UE 115. Some signals (such as synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (such as by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (such as a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (such as by a base station 105 or a UE 115) may be performed using multiple beam directions, and the device may use a combination of digital precoding or radio frequency beamforming to generate a combined beam for transmission (such as from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (such as a cell-specific reference signal (CRS), a channel state information (CSI) reference signal (CSI-RS)), which may be precoded or unprecoded. The UE 115 may provide feedback for beam selection, which may be a precoding matrix indicator (PMI) or codebook-based feedback (such as a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (such as for identifying a beam direction for subsequent transmission or reception by the UE 115) or for transmitting a signal in a single direction (such as for transmitting data to a receiving device).

A receiving device (such as a UE 115) may try multiple receive configurations (such as directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (such as different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (such as when receiving a data signal). The single receive configuration may be aligned in a beam direction determined based on listening according to different receive configuration directions (such as a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer also may use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (such as using a cyclic redundancy check (CRC)), forward error correction (FEC), and retransmission (such as automatic repeat request (ARQ)). HARQ may improve throughput at the MAC layer in poor radio conditions (such as low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

As demand for communication resources increases due to an increasing number of wireless devices communicating over the available spectrum, techniques to increase throughput efficiently and reliably are desirable. In some examples, communicating devices (such as UEs 115 and base stations 105) may use additional frequency ranges and the communicating devices may achieve greater throughput based on using such additional frequency ranges. Such additional frequency ranges may refer to relatively higher frequency ranges. Higher frequency ranges, such as FR2 radio frequency spectrum band including millimeter wave (mmW) frequency ranges (for example, frequencies above 6 GHz, such as frequencies between 24.25-52.6 GHz) and FR4 radio frequency spectrum band including upper-mmW frequency ranges (such as frequencies between 52.6 GHz-114.25 GHz), may be employed for wireless communications between multiple devices, and transmitting at these higher frequencies may include transmitting at shorter wavelengths and, in some implementations, according to beamforming techniques. For instance, based on transmitting at shorter wavelengths, signals carried by the FR2 or the FR4 radio frequency spectrum bands may be more susceptible to the impacts of interference or path loss, and transmitting or receiving devices, or both, may employ beamforming techniques to increase the signal strength of such signals carried by the FR2 or the FR4 radio frequency spectrum bands. Further, frequency ranges beyond FR4 are not precluded in this disclosure (such as 114.25-300 GHz which may be referred to as "sub-THz" bands).

A UE 115 may employ such beamforming techniques at one or more antenna modules of the UE 115. For example, the UE 115 may transmit or receive signals directionally at an antenna module based on tuning a radio frequency chain connected to or coupled with the antenna module using a set of phase shifters and gain control stages. In some examples, the UE 115 may use a single set of phase shifters for each antenna module of the UE 115 and, as such, analog or radio frequency beamforming may be constrained (for example, may be limited by the single set of phase shifters and gain controls), which may lead to poor performance at some frequencies in examples in which the UE 115 is communicating over the FR2 or the FR4 radio frequency spectrum bands. For example, such constrained analog or radio frequency beamforming may lead to poor performance in examples in which the UE 115 is communicating over an ultra-wide bandwidth. In some examples, the UE 115 may tune or optimize an analog or radio frequency beamforming codebook of the UE 115 or of an antenna module of the UE 115 for some carrier frequency over the FR2 or the FR4 radio frequency spectrum band (over the ultra-wide bandwidth of interest), and such a carrier frequency may be referred to herein as a DOF. In some examples, the UE 115 may operate multiple antenna modules, each with a different analog or radio frequency beamforming codebook, and the UE 115 may configure each antenna module with a DOF (such that the DOFs of the multiple antenna modules of the UE may be the same or may be different).

Similarly, a base station 105 may employ such beamforming techniques at one or more antenna panels or antenna ports of the base station 105 based on tuning a radio frequency chain connected to or coupled with an antenna panel or antenna port using a set of phase shifters and gain control stages. The base station 105 may tune or optimize an analog or radio frequency beamforming codebook of the base station 105 or of an antenna panel or port of the base station 105 for some carrier frequency over the FR2 or the FR4 radio frequency spectrum bands (over the ultra-wide bandwidth of interest), and, as described herein, such a carrier frequency may be referred to herein as a DOF. In some examples, the base station 105 may operate multiple antenna panels or ports and the base station 105 may configure each antenna panel or port with a DOF (such that the DOFs of the multiple antenna panels or ports of the base station 105 may be the same or may be different). Additionally, the base station 105 may support multiple cells, such as a primary cell and a secondary cell, and each of the primary cell and the secondary cell may operate (communicate) over a different radio frequency spectrum band (and likewise each cell may configure varying DOFs for their respective antenna ports).

The UE 115 and the base station 105 may configure their respective radio frequency chains or ports with varying DOFs, such that a first DOF configured at a first antenna module of the UE 115 may be different than a second DOF of a first port of the base station 105. Such variation in DOF between the UE 115 and the base station 105 may influence the likelihood for the UE 115 and the base station 105 to successfully communicate with each other. For example, if the first DOF of the first antenna module of the UE 115 is greater than a threshold difference from the second DOF of the first port of the base station 105, the UE 115 or the base station 105 may be unable to detect or receive signaling in examples in which they communicate via the first antenna module of the UE 115 and the first port of the base station 105 (based on signal strength distortions), which may result in communication failures or loss in performance (such as data rate or reliability, among other examples) between the UE 115 and the base station 105.

In some implementations of the present disclosure, the UE 115 may indicate a set of candidate beams for the base station 105 to use for communication with the UE 115 based on the variation in DOF between the UE 115 and the base station 105. For example, the UE 115 may transmit an indication to the base station 105 of the set of candidate beams such that each beam of the set of candidate beams is associated with a port of the base station 105 that has a DOF within a threshold difference of a DOF of the UE 115. The UE 115 may apply such techniques for refining a beam training or beam selection procedure based on DOF mismatch between the UE 115 and the base station 105 to scenarios in which the UE 115 communicates with the base station 105 in a CA or DC deployment, in which the UE 115 may communicate with multiple cells of the base station 105 (or multiple base stations 105, such as multiple cell groups) configured for communication over different radio frequency spectrum bands. Additional details relating to such extension of beam selection based on DOF mismatch to CA and DC deployments are described herein, including with reference to FIGS. 2-4.

Figure 2:
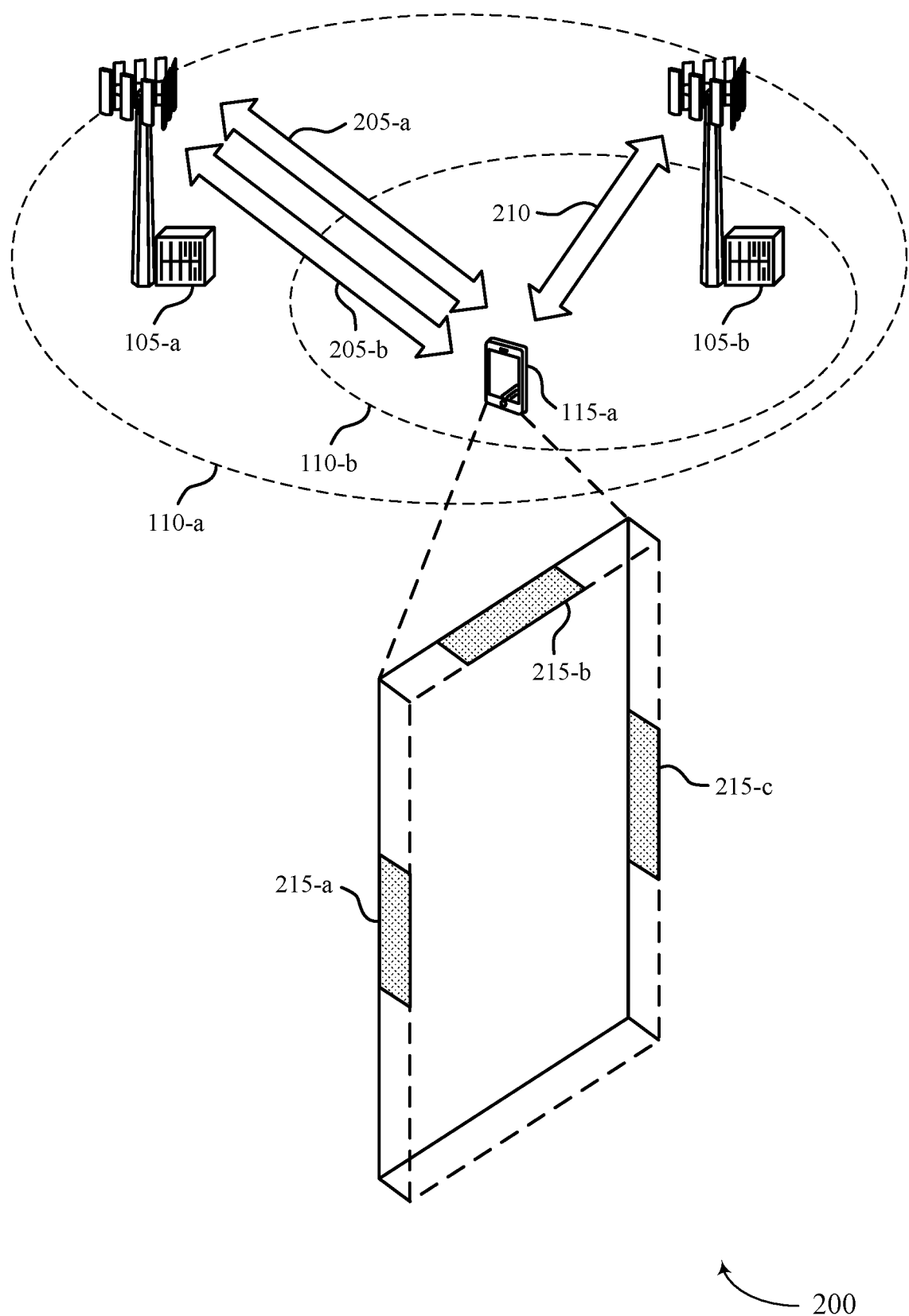

FIG. 2 illustrates an example of a wireless communications system 200 that supports techniques for indicating beams in DC-CA systems based on a DOF mismatch. The wireless communications system 200 may implement aspects of the wireless communications system 100. For example, the wireless communications system 200 illustrates communication between a UE 115-*a*, a base station 105-*a*, and a base station 105-*b*, which may be examples of corresponding devices described herein, including with reference to FIG. 1. In some implementations, the UE 115-*a* may transmit an indication of a set of candidate beams to the base station 105-*a* or the base station 105-*b* to indicate which beams the base station 105-*a* or the base station 105-*b* may use for communication with the UE 115-*a* based on a DOF mismatch between the beams (or corresponding antenna ports) of the base station 105-*a* or the base station 105-*b* and an antenna module 215 of the UE 115-*a*.

The UE 115-*a* may communicate with one or both of the base station 105-*a* or the base station 105-*b* based on whether the UE 115-*a* is operating in a CA or a DC deployment. For instance, in examples in which the UE 115-*a* operates in a DC deployment, the UE 115-*a* may perform simultaneous transmission and reception of data on multiple component carriers to or from two cell groups via two base stations 105, such as the base station 105-*a* and the base station 105-*b*. For example, the UE 115-*a* may communicate with a master cell group (MCG) via the base station 105-*a* (a master node, an MeNB, or MgNB) and the UE 115-*a* may communicate with a secondary cell group (SCG) via the base station 105-*b* (a secondary node, an SeNB, or an SgNB). In some aspects, the base station 105-*a* (the MCG) may be associated with a geographic coverage area 110-*a* and the base station 105-*b* (the SCG) may be associated with a geographic coverage area 110-*b*. In examples in which the UE 115-*a* operates in a DC deployment, the wireless communications system 200 may support either or both of standalone (SA) deployments or non-standalone (NSA) deployments.

In SA deployments, both the MCG and the SCG (for example, both the base station 105-*a* and the base station 105-*b*) may communicate using a same radio access technology (RAT) and the UE 115-*a* may connect to either of the MCG or the SCG (for example, either of the MCG or the SCG without support from the other). For example, in SA deployments, both the MCG and the SCG may communicate using NR (and likewise communicate over NR radio frequency spectrum bands, such as the FR2 or the FR4 radio frequency spectrum bands) or both the MCG and the SCG may communicate using LTE (and likewise communicate over LTE radio frequency spectrum bands, such as the FR1 radio frequency spectrum band).

Alternatively, in NSA deployments, the MCG and the SCG may communicate using different RATs (or different component carriers or radio frequency spectrum bands) and the UE 115-*a* may connect to both of the MCG and the SCG at the same time. For example, the MCG may communicate using LTE and the SCG may communicate using NR and the UE 115-*a* may connect to either or both of the LTE MCG and the NR SCG at a time. In examples in which the UE 115-*a* operates in a DC deployment, the UE 115-*a* may communicate (transmit or receive) data signaling with the base station 105-*a* (the MCG, MeNB, or MgNB) over a communication link 205-*a* (which may be an example of a physical uplink shared channel (PUSCH) in DC deployments), may communicate control signaling with the base station 105-*a* over a communication link 205-*b* (which may be an example of a physical uplink control channel (PUCCH) in DC deployments), and may communicate data signaling with the base station 105-*b* (the SCG, SeNB, or SgNB) over a communication link 210 (which may be an example of a PUSCH in DC deployments).

Alternatively, in examples in which the UE 115-*a* operates in a CA deployment, the UE 115-*a* may communicate with a base station 105 over multiple component carriers. For example, the UE 115-*a* may communicate with the base station 105-*a* over multiple component carriers to achieve greater frequency diversity than may otherwise be achieved based on communicating over a single component carrier. In examples in which the UE 115-*a* communicates with the base station 105-*a* over multiple component carriers, the base station 105-*a* may operate multiple cells that are each capable of communicating over different component carriers. For example, the base station 105-*a* may operate a primary cell (PCell) for communication with the UE 115-*a* over a primary component carrier (a primary frequency range) and may operate a secondary cell (SCell) for communication with the UE 115-*a* over a secondary component carrier (a secondary frequency range). In some aspects, the primary component carrier may be within the FR1 or the FR2 radio frequency spectrum bands and the secondary component carrier may be within the FR2 or the FR4 radio frequency spectrum bands. In examples in which the UE 115-*a* operates in the CA deployment, the UE 115-*a* may communicate with the PCell of the base station 105-*a* via the communication link 205-*a* (which may be an example of the primary component carrier in CA deployments) and may communicate with the SCell of the base station 105-*a* via the communication link 205-*b* (which may be an example of the secondary component carrier in CA deployments).

In some implementations, the UE 115-*a* and the base station 105-*a* may aggregate up to five component carriers of the same frame structure. In some other implementations, the UE 115-*a* and the base station 105-*a* may perform inter-band time division duplexing (TDD) CA with different uplink and downlink configurations, CA with multiple (different) uplink timing advances, and aggregation of carriers with different frame structures. In some examples, the UE 115-*a* may transmit uplink control information for the aggregated carriers over a physical uplink control channel (PUCCH) on the PCell and, in some further examples (such as in examples in which a number of aggregated carriers leads to an overloaded or filled PCell PUCCH), the UE 115-*a* may additionally, or alternatively, transmit uplink control information for the aggregated carriers over a PUCCH on the SCell.

In both CA or DC deployments, the UE 115-*a* and the connected cells (which may include one or both of the base station 105-*a* or the base station 105-*b*, depending on whether the UE 115-*a* is operating in a CA or a DC deployment) may communicate over one or more radio frequency spectrum bands. In examples in which the UE 115-*a* communicates with various cells over different radio frequency spectrum bands or over different component carriers (in both CA and DC deployments), the cells may use different constellations, different MCSs, or transmit different symbols (such as different length symbol periods). Additionally, in some examples, the UE 115-*a* may communicate with the connected cells over ultra-wide bandwidths, such as bandwidths in the FR2 or FR4 radio frequency spectrum bands. FR4 bands, which may be referred to as "upper mmW bands" or as radio frequencies in the "sub-THz regime," may have shorter wavelengths λ than FR2 bands.

For example, the FR2 radio frequency spectrum band may include frequencies between 24.25-52.6 GHz and the FR4 radio frequency spectrum band may include frequencies between 52.6 GHz-114.25 GHz. In some examples, because the frequencies in the FR4 radio frequency spectrum band have shorter wavelengths than frequencies in the FR2 radio frequency spectrum band, more antenna elements may be packed into a same physical aperture in examples in which a device is configured to communicate over the FR4 radio frequency spectrum band than in examples in which the device is configured to communicate over the FR2 radio frequency spectrum band. This may result in antenna arrays having a greater number of antenna elements with which the device is configured to communicate over the FR4 radio frequency spectrum band. As demand for greater throughput and capacity continue, extensions to higher radio frequency spectrum bands, such as an FR5 radio frequency spectrum band, may be possible, which may result in more densely packed antenna arrays.

Devices operating in the FR2 or FR4 radio frequency spectrum bands may use a portion or a subset of the full radio frequency spectrum band. For example, a device operating over the FR4 radio frequency spectrum band may receive an allocation of a subset frequency range within the 52.6 to 114.25 GHz frequency range. Such a subset frequency range in the FR2 or the FR4 radio frequency spectrum bands may be relatively wider than frequency allocations in other radio frequency spectrum bands and, as such, may be referred to herein as an ultra-wide bandwidth. For instance, an approximately 14 GHz wide bandwidth (such as a 14 GHz subset of the FR4 radio frequency spectrum band) may be available to devices across multiple geographies and, in some examples, a device communicating over such an ultra-wide bandwidth may experience performance and beamforming gains (such as greater throughput). In some aspects, a device may receive an allocation of such a 14 GHz wide bandwidth from 57-71 GHz.

Some devices may use a single radio frequency chain to communicate over the ultra-wide bandwidth (such as an approximately 14 GHz bandwidth range) and, because such devices may use a single set of phase shifters and gain control stages for a single radio frequency chain, analog or radio frequency beamforming may be constrained (or limited to some carrier frequencies) based on the use of a single radio frequency chain, which may result in poor performance at some frequencies. Such poor performance at some frequencies as a result of limited analog or radio frequency beamforming may be referred to as "beam squinting." Further, some devices may tune or optimize their radio frequency chain (for example, an analog or radio frequency beamforming codebook) for some carrier frequency, which may be referred to herein as a DOF, over the ultra-wide bandwidth of interest (such as the 14 GHz wide bandwidth from 57-71 GHz).

As such, the devices may experience a greater likelihood for successful communications with another device that is also using a same or similar DOF. In other words, a DOF may correspond to a frequency for which a radio frequency chain is tailored in terms of peak (or increased) beamforming array gain relative to other frequencies within an ultra-wide bandwidth frequency allocation. Additionally, the DOF of a node or device also may be referred to as a metric that captures the frequency whose half wavelength is equal to the inter-element spacing on an antenna array or panel in operation. For example, for some wavelength λ, an inter-element spacing may be d=λ/2 and the corresponding DOF may be equal to c/λ=c/2d, in which c refers to the speed of light. As such, an antenna panel of a device may have a DOF based on the designed or configured inter-element spacing of the antenna panel, and the device may adjust or tailor the DOF of the antenna panel based on configuring or tuning a radio frequency chain of the (or coupled to) antenna array or panel.

A DOF may be device- and radio frequency chain-specific and may be unknown at a device at the other end of a link. For example, the UE 115-a may tune or optimize an analog or radio frequency codebook of the UE 115-a for a first DOF and the base station 105-a and the base station 105-b may be unaware of the first DOF used by the UE 115-a. Accordingly, in some examples, communicating devices may signal (such as broadcast, for example, via capability signaling) or otherwise share information relating to configured DOFs. In some aspects, the signaling may be from base station 105 to UE 115. In some other aspects, the signaling may be from UE 115 to base station 105.

Communication over such an ultra-wide bandwidth using more specific or granular DOFs, however, may potentially result in DOF mismatches between the UE 115-a and a cell that is a candidate for connection. For example, in some scenarios, the UE 115-a may operate in a CA or a DC deployment in which multiple cells to which the UE 115-a may connect may operate over different radio frequency spectrum bands such that the multiple cells support varying DOFs. For instance, in examples in which the UE 115-a operates in a DC deployment with the base station 105-a as a MCG or a PCell and with the base station 105-b as a SCG or a PSCell, the base station 105-a may operate within FRx bands and the base station 105-b may operate within FRy bands (in which x or y=1, 2, 3, 4, or 5, such that FR3 may include 7.125-24.25 GHz and FR4 may include FR4-1a referring to 52.6-71 GHz and FR4 referring to 52.6-114.25 GHz). Similarly, in examples in which the UE 115-a operates in a CA deployment with the base station 105-a including a PCell and an SCell, the base station 105-a may operate the PCell (such as the PCell PUCCH) within FRx bands and the base station 105-a may operate the SCell (such as the SCell PUCCH) within FRy bands (in which x or y=1, 2, 3, 4, or 5).

If either FRx or FRy supports or otherwise includes ultra-wide bandwidth operation (such as 24-48 GHz which may occur over the FR2 radio frequency spectrum band or 57-71 GHz which may occur over the FR4-1a radio frequency spectrum band), the corresponding cell (the cell operating over such an ultra-wide bandwidth) may configure a DOF for each operating antenna subarray or panel used to transmit or receive signals at the base station 105 side of the communication link. The UE 115-a, on the other end of the link, also may configure each of a number of antenna modules 215 of the UE 115-a with a DOF within either or both of the FRx or the FRy radio frequency spectrum bands (for example, based on a capability of the UE 115-a) for communication (transmit or receive) operations with a cell. For example, the UE 115-a may operate an antenna module 215-a, an antenna module 215-b, and an antenna module 215-c and may configure each antenna module 215 with a DOF within either the FRx or the FRy radio frequency spectrum bands (based on the capability of the UE 115-a). Accordingly, based on the radio frequency spectrum band over which a cell or the UE 115-a may operate, the choice or configuration of a DOF may vary across radio frequency chains or ports at a base station 105 and may vary across radio frequency chains, ports, or antenna modules 215 at the UE 115-a. In some aspects, the UE 115-a may transmit, to one or both of the base station 105-a or the base station 105-b, an indication of the two bands (FRx and FRy) in PCell/PSCell of DC or PCell PUCCH/SCell PUCCH of CA (for example, based on a UE capability).

As such, and based on the ultra-wide bandwidth operation over either FRx or FRy, the DOF of the beams (such as transmit beams, or receive beams, or both) used for communication between the UE 115-a and a connected cell may be mismatched, which may result in a lower likelihood of successful communications between the UE 115-a and the connected cell. For instance, in examples in which a first cell (such as a MCG or a PCell) is operating at a first DOF within FRx and a first antenna module 215 of the UE 115-a is operating at a second DOF within FRy and if the communication link between the first cell and the UE 115-a is via the first antenna module 215, communication between the first cell and the UE 115-a may have a lower likelihood of being successfully received and decoded as compared to examples in which the first DOF and the second DOF are relatively similar or within a threshold range of each other.

In some implementations of the present disclosure, the UE 115-a may indicate a choice of beams for the two radio frequency spectrum bands in PCell and PSCell (in examples in which the UE 115-a operates in a DC deployment) or PCell PUCCH and SCell PUCCH (in examples in which the UE 115-a operates in a CA deployment) based on a function of a DOF mismatch across the communication links between the UE 115-a and a base station 105. For example, if the UE 115-a identifies a potential connection between a beam of a cell and an antenna module 215 of the UE 115-a, the UE 115-a may determine whether to establish the connection between the cell of the base station 105 using the beam of the cell and the antenna module 215 of the UE 115-a based on a DOF mismatch between the beam of the cell (or the radio frequency chain or port of the cell from which the beam is formed) and the antenna module 215 of the UE 115-a. For instance, in examples in which the UE 115-a receives an indication of the DOFs configured at the ports of the cells, the UE 115-a may determine which ports or beams the cells may use for communication with the UE 115-a based on cross-referencing a look-up-table of beam training statistics with DOF mismatches between the ports of the cells and the antenna modules 215 of the UE 115-a.

In some examples, the UE 115-a may compare a first DOF of the beam of the cell (a first DOF of the radio frequency chain or port of the cell from which the beam is formed) and a second DOF of the antenna module 215 of the UE 115-a that receives the beam and determine whether to select the beam as a candidate beam for communication between the cell and the UE 115-a based on whether the first DOF and the second DOF are within a threshold range (a threshold DOF mismatch) of each other. In other words, the UE 115-a may determine whether to select the beam as a candidate beam for communication between the cell and the UE 115-a based on whether a difference between the first DOF and the second DOF is within or smaller than a threshold DOF mismatch. Such a threshold DOF mismatch may be preconfigured at the UE 115-a or the UE 115-a may receive an indication of the threshold DOF mismatch (from one or both of the base station 105-*a* or the base station 105-*b*). Additional details relating to such use of a DOF mismatch between a port of a cell and an antenna module 215 of the UE 115-*a* to select a set of candidate beams for establishing communication between the cell and the UE 115-*a* are described herein, including with reference to FIGS. 3 and 4.

In some implementations, the UE 115-*a* may transmit the indication of the set of candidate beams to one or both of the base station 105-*a* or the base station 105-*b* based on indicating the ports corresponding to the set of candidate beams (the ports from which the set of candidate beams are formed). For example, the UE 115-*a* may transmit an indication of a TCI state corresponding to each port from which the set of candidate beams are formed and the cells may identify which ports to use for beamforming to the UE 115-*a* (such as for transmit beamforming by the cells for downlink transmission to the UE 115-*a*, or for receive beamforming by the cells for uplink transmission from the UE 115-*a*) based on the indicated TCI states. Additionally, or alternatively, the UE 115-*a* may transmit an indication of the set of candidate beams for each antenna module 215 of the UE 115-*a* (such as for transmit beamforming by the UE 115-*a* for uplink transmission to the cells, or for receive beamforming by the UE 115-*a* for receiving downlink transmission from the cells). For example, the UE 115-*a* may indicate which beams the cells may use (or which DOFs the cell may use) for communication with the UE 115-*a* for each antenna module 215 of the UE 115-*a*. In some implementations, the UE 115-*a* may additionally indicate one or more beams that the UE 115-*a* may use for communication with the cells based on the DOF mismatches. Additionally, in some implementations, the UE 115-*a* may indicate a measured or determined DOF mismatch between the ports from which the set of candidate beams are formed and the receiving antenna module 215 of the UE 115-*a*.

For example, the UE 115-*a* may identify a first DOF mismatch between a first port of a first cell and an antenna module 215 of the UE 115-*a* and may identify a second DOF mismatch between a second port of a second cell and an antenna module 215 of the UE 115-*a* and, in examples in which the UE 115-*a* determines that the first cell and the second cell may use the first port and the second port, respectively, for communication with the UE 115-*a*, the UE 115-*a* may include an indication of the first DOF mismatch and the second DOF mismatch in the signaling transmitted to the base station 105-*a* or the base station 105-*b*. In some aspects, such a reported DOF mismatch may be referred to as a DOF delta. As such, the receiving base station 105 may obtain greater knowledge of the existing DOF mismatches between the UE 115-*a* and the cells and, in some examples, may make scheduling decisions or re-tuning (DOF re-tuning) decisions based on the existing DOF mismatches. For example, the receiving base station 105 may attempt to establish a connection between the UE 115-*a* and a third cell or a different beam of either the first cell or the second cell that may reduce an existing DOF mismatch or the receiving base station 105 may determine to re-tune a radio frequency chain of a port of a cell to reduce an existing DOF mismatch. Such base station-led assistance based on a reported DOF mismatch may increase the likelihood for successful communication between communicating devices (such as between a customer premises equipment (CPE) and a modem, in an example).

Additionally, or alternatively, the UE 115-*a* may select or refine the set of candidate beams as a function of out-of-band emissions (interference) caused by the selected beams. For example, the UE 115-*a* may select one or more beams of the cell out of a set of beams of the cell that satisfy an out-of-band emission threshold (such that the cell refrains from using transmit beams that may cause relatively higher interference to other devices). Additionally, or alternatively, the UE 115-*a* may differentiate between selected sets of candidate beams based on uplink and downlink communication. In other words, for example, the UE 115-*a* may select a first set of candidate beams for the cell to use for downlink communication with the UE 115-*a* (such as one or more transmit beams of one or more cells, or one or more receive beams of the UE 115-*a*, or a combination thereof) and the UE 115-*a* may select a second set of candidate beams for the cell to use for uplink communication with the UE 115-*a* (such as one or more receive beams of one or more cells, or one or more transmit beams of the UE 115-*a*, or a combination thereof). In examples in which the UE 115-*a* selects the second set of candidate beams for the cell to use for uplink communication with the UE 115-*a*, the UE 115-*a* may additionally select the second set of candidate beams based on a maximum permissible exposure (MPE) threshold or constraints (or other regulatory constraints on effective isotropic radiated power (EIRP)), constraints on bandwidth or component cost differentials between a power amplifier (PA) and a low noise amplifier (LNA) on an uplink path and a downlink path, a power threshold on either the uplink path or the downlink path, or cost constraints that preclude the use of some antenna elements (for uplink or downlink operation), among other examples.

Further, although described herein in the context of the UE 115-*a* selecting the beams usable by the cells for communication with the UE 115-*a*, one or more cells (such as one or both of the base station 105-*a* or the base station 105-*b*) may perform similar operations or functions to determine (amongst themselves) which ports and beams to use for communication with the UE 115-*a* based on DOF mismatches. In such examples, the UE 115-*a* may transmit an indication of one or more DOFs supported by the UE 115-*a* to one or both of the base station 105-*a* or the base station 105-*b* and the base station 105-*a* or the base station 105-*b* (depending on whether the UE 115-*a* is operating in a CA or a DC deployment) may determine which ports and beams to use to communicate (such as to receive communications, or to transmit communications, or both) with the UE 115-*a* based on the knowledge of the DOFs configured at the UE 115-*a*. Additionally, in some examples, the UE 115-*a* may transmit one or more uplink reference signals (such as sounding reference signals (SRSs)) and the one or both of the base station 105-*a* or the base station 105-*b* may determine which ports and which beams to use to communicate with the UE 115-*a* based on receiving the one or more uplink reference signals.

Figure 3:
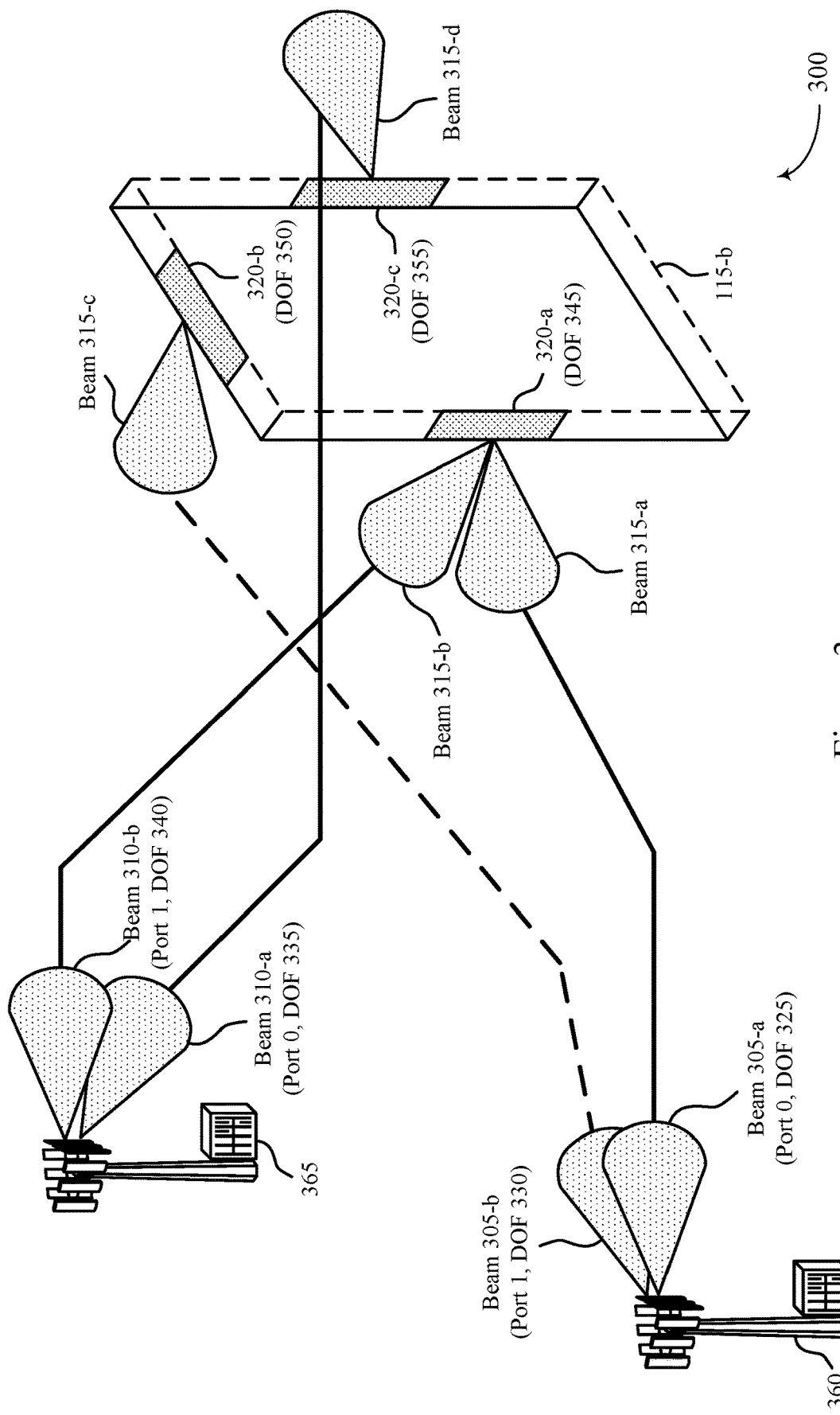
FIGS. 3 and 4 illustrate examples of beam selection diagrams that support techniques for indicating beams in DC-CA systems based on a DOF mismatch.

FIG. 3 illustrates an example of a beam selection diagram 300 that supports techniques for indicating beams in DC-CA systems based on a DOF mismatch. The beam selection diagram 300 illustrates the selection of beams at a cell 360 (which may be an example of or function as a PCell or a MCG), a cell 365 (which may be an example of or function as an SCell, a PSCell, or an SCG), and at a UE 115-*b* for communication between the UE 115-*b*, the cell 360, and the cell 365. In some examples, the UE 115-*b* may receive (from one of the cell 360, the cell 365, or from a serving base station) an indication of a DOF for each if not all ports of the cell 360 and the cell 365 and the UE 115-*b* may transmit an indication of a set of candidate beams that the cell 360 and the cell 365 may use for communicating with the UE 115-*b* based on a DOF mismatch between ports of the cells and antenna modules 320 of the UE 115-*b*.

For example, the cell 360 may operate multiple ports over a radio frequency spectrum band and may tune or configure each of the multiple ports to a DOF within the radio frequency spectrum band to increase or optimize performance (such as increasing received signal strength) for communications over the configured DOFs. In some examples, the cell 360 may operate a first port (a port 0) and a second port (a port 1) and the cell 360 may configure the first port with a DOF 325 and may configure the second port with a DOF 330. Similarly, the cell 365 may operate multiple ports over a radio frequency spectrum band and may tune or configure each of the multiple ports to a DOF within the radio frequency spectrum band to increase or optimize performance for communications over the configured DOFs. For example, the cell 365 may operate a first port (a port 0) and a second port (a port 1) and the cell 365 may configure the first port with a DOF 335 and may configure the second port with a DOF 340.

In some aspects, the beam selection diagram 300 may be described in the context of the cell 360 and the cell 365 both operating over the FR4 radio frequency spectrum band and, as such, the DOF 325, the DOF 330, the DOF 335, and the DOF 340 may be within the FR4 radio frequency spectrum band. For instance, the cell 360 may configure the first port with a DOF of 69 GHz (such that the DOF 325=69 GHz) and may configure the second port with a DOF of 69 GHz (such that the DOF 330=69 GHz). Similarly, the cell 365 may configure the first port with a DOF of 57 GHz (such that the DOF 335=57 GHz) and may configure the second port with a DOF of 67 GHz (such that the DOF 340=67 GHz). As described herein, the cell 360, the cell 365, or a serving base station may transmit an indication of the DOF configured at each port of the cell 360 and the cell 365 to the UE 115-*b*.

The UE 115-*b* may operate multiple antenna modules 320, including an antenna module 320-*a*, an antenna module 320-*b*, and an antenna module 320-*c*, over a radio frequency spectrum band (or over multiple radio frequency spectrum bands) and may tune or configure each of the multiple antenna modules 320 to a DOF within the radio frequency spectrum band (or within the multiple radio frequency spectrum bands) to increase or optimize performance for communications over the configured DOFs. For example, the UE 115-*b* may configure the antenna module 320-*a* with a DOF 345, may configure the antenna module 320-*b* with a DOF 350, and may configure the antenna module 320-*c* with a DOF 355. In some examples, such as in examples in which the cell 360 and the cell 365 operate within the FR4 radio frequency spectrum band, the UE 115-*b* may configure the antenna modules 320 of the UE 115-*b* such that the DOF 345, the DOF 350, and the DOF 355 are within the FR4 radio frequency spectrum band. For instance, the UE 115-*b* may configure the antenna module 320-*a* with a DOF of 71 GHz (such that the DOF 345=71 GHz), may configure the antenna module 320-*b* with a DOF of 57 GHz (such that the DOF 350=57 GHz), and may configure the antenna module 320-*c* with a DOF of 60 GHz (such that the DOF 355=60 GHz).

As such, in some examples, the UE 115-*b* may operate three antenna modules 320 with DOFs of 71 GHz, 57 GHz, and 60 GHz, the cell 360 may operate two ports with DOFs of 69 GHz and 69 GHz, and the cell 365 may operate two ports with DOFs of 57 GHz and 67 GHz. The cell 360 and the cell 365 may form one or more directional beams (such as one or more transmit beams, or one or more receive beams, or both) from each port. For example, the cell 360 may form beams 305 from the ports of the cell 360, including a beam 305-*a* from the first port and a beam 305-*b* from the second port. Similarly, the cell 365 may form beams 310 from the ports of the cell 365, including a beam 310-*a* from the first port and a beam 310-*b* from the second port. Additionally, the UE 115-*b* may form one or more beams 315 from each antenna module 320 of the UE 115-*b*, including a beam 315-*a* and a beam 315-*b* from the antenna module 320-*a*, a beam 315-*c* from the antenna module 320-*b*, and a beam 315-*d* from the antenna module 320-*c*.

In some examples, such as in examples in which the UE 115-*b* attempts to synchronize with the cell 360 and the cell 365, the cells may each transmit synchronization signals, such as SSBs, via beams towards the UE 115-*b* and the UE 115-*b* may receive the SSBs via the beams at one or more of the antenna modules 320 of the UE 115-*b*. For example, the cell 360 may transmit one or more SSBs via the beams 305 over the two ports of the cell 360 at 69 GHz and the cell 365 may transmit one or more SSBs via the beams 310 over the two ports of the cell 365 at 57 GHz and 67 GHz (such that the UE 115-*b* may receive four clusters from the cell 360 and the cell 365). The UE 115-*b* may receive or be configured with a mapping between sets of SSBs and ports, and the UE 115-*b* may use the mapping between the sets of SSBs and the ports and the indication of the DOF supported by each port to determine the DOF mismatch based on receiving an SSB at an antenna module 320 of the UE 115-*b* (an SSB corresponds to a port based on the mapping and the port corresponds to an indicated DOF). For example, the mapping may indicate that the first port (port 0) of the cell 360 is associated with SSBs 1-8 and that the second port (port 1) of the cell 360 is associated with SSBs 9-12 such that, if the UE 115-*b* receives an SSB, the UE 115-*b* may determine the port of the cell 360 from which the SSB was transmitted.

The UE 115-*b* may receive the SSBs via the beams 305 and the beams 310 from the cell 360 and the cell 365, respectively, and identify a set of candidate beams that the cell 360 and the cell 365 may use for communication with the UE 115-*b* based on which antenna module 320 of the UE 115-*b* receives the SSBs and based on a DOF mismatch between the transmitting port and the receiving antenna module 320 (beam selection may be module-specific at the UE 115-*b* and based on MCG or SCG transmissions). In some examples, the UE 115-*b* may receive an SSB transmitted via the beam 305-*a* at the antenna module 320-*a* using the beam 315-*a*, may receive an SSB transmitted via the beam 305-*b* at the antenna module 320-*b* using the beam 315-*c*, may receive an SSB transmitted via the beam 310-*a* at the antenna module 320-*c* using the beam 315-*d*, and may receive an SSB transmitted via the beam 310-*b* at the antenna module 320-*a* using the beam 315-*b*. In some aspects, the UE 115-*b* may receive an SSB at an antenna module 320 based on the orientations or relative locations of the cell 360, the cell 365, and the antenna modules 320 of the UE 115-*b*.

The UE 115-*b*, based on receiving the one or more SSBs via the beams 305 and the beams 310 from the cell 360 and the cell 365, respectively, may select a set of candidate beams from the beams 305 and the beams 310 based on the DOF mismatch between the port associated with the beams 305 and the beams 310 and the antenna module 320 that receives an SSB via the beams 305 and the beams 310. For example, at the antenna module 320-*a*, the UE 115-*b* may receive an SSB from the first port of the cell 360 via the beam 305-*a* using the beam 315-*a* and may receive an SSB from the second port of the cell 365 via the beam 310-*b* using the beam 315-*b*.

In such examples, the UE 115-*b* may compare the DOF 325 of the first port of the cell 360 with the DOF 345 of the antenna module 320-*a* and may compare the DOF 340 of the second port of the cell 365 with the DOF 345 of the antenna module 320-*a* and, based on the comparison, may determine whether to select one or both of the beam 305-*a* or the beam 310-*b* as candidate beams. In examples in which the first port of the cell 360 has a DOF 325 of 69 GHz, the second port of the cell 365 has a DOF 340 of 67 GHz, and the antenna module 320-*a* has a DOF 345 of 71 GHz, the UE 115-*b* may determine that both the first port of the cell 360 and the second port of the cell 365 have DOFs within a threshold range from the DOF 345 of the antenna module 320-*a* and the UE 115-*b* may select the beam 305-*a* and the beam 310-*b* as candidate beams (as illustrated by solid lines) within the set of candidate beams that the cell 360 and the cell 365 may use for communication with the UE 115-*b*.

For further example, at the antenna module 320-*b*, the UE 115-*b* may receive an SSB from the second port of the cell 360 via the beam 305-*b* using the beam 315-*c*. In such examples, the UE 115-*b* may compare the DOF 330 of the second port of the cell 360 with the DOF 350 of the antenna modules 320-*b* and, based on the comparison, may determine whether to select the beam 305-*b* as a candidate beam. In examples in which the second port of the cell 360 has a DOF 330 of 69 GHz and the antenna module 320-*b* has a DOF 350 of 57 GHz, the UE 115-*b* may determine that the second port of the cell 360 has a DOF 330 outside of the threshold range from the DOF 350 of the antenna module 320-*b* and the UE 115-*b* may refrain from selecting the beam 305-*b* as a candidate beam (as illustrated by a dotted line) within the set of candidate beams that the cell 360 and the cell 365 may use for communication with the UE 115-*b*. In other words, the difference between a DOF of 69 GHz and a DOF of 57 GHz (12 GHz) may exceed a threshold DOF mismatch and may result in communication failures if the UE 115-*b* and the cell 360 attempt to communicate with each other using such DOFs.

For further example, at the antenna module 320-*c*, the UE 115-*b* may receive an SSB from the first port of the cell 365 via the beam 310-*a* using the beam 315-*d*. In such examples, the UE 115-*b* may compare the DOF 335 of the first port of the cell 365 with the DOF 355 of the antenna module 320-*c* and, based on the comparison, may determine whether to select the beam 310-*a* as a candidate beam. In examples in which the first port of the cell 365 has a DOF 335 of 57 GHz and the antenna module 320-*c* has a DOF 355 of 60 GHz, the UE 115-*b* may determine that the first port of the cell 365 has a DOF 335 within the threshold range from the DOF 355 of the antenna module 320-*c* and the UE 115-*b* may select the beam 310-*a* as a candidate beam (as illustrated by a solid line) within the set of candidate beams that the cell 360 and the cell 365 may use for communication with the UE 115-*b*. In other words, the difference between a DOF of 57 GHz and a DOF of 60 GHz (3 GHz) may be within a threshold DOF mismatch.

The UE 115-*b*, based on selecting the beam 305-*a*, the beam 310-*a*, and the beam 310-*b* as candidate beams within the set of candidate beams that the cell 360 and the cell 365 may use for communication with the UE 115-*b* (such as for transmission of communications to the UE 115-*b*, or for reception of communications from the UE 115-*b*, or both), may transmit an indication of the selected beams (the set of candidate beams) to one or both of the cell 360 or the cell 365 or to a serving base station. In some examples, the UE 115-*b* may transmit the indication of the selected beams based on transmitting an indication of the ports of the cells associated with the selected beams (the ports from which the selected beams are formed). For example, the UE 115-*b* may indicate the first port of the cell 360, the first port of the cell 365, and the second port of the cell 365 to indicate the beam 305-*b*, the beam 310-*a*, and the beam 310-*b*, respectively.

In some aspects, the UE 115-*b* may indicate the various ports associated with the selected beams based on transmitting an indication of a TCI state corresponding to the various ports. For example, the ports of the cells to which the UE 115-*b* may connect may each have a corresponding TCI state and the UE 115-*b* may indicate which ports the cells may use to communicate with the UE 115-*b* based on indicating one or more TCI states corresponding to one or more ports. Additionally, in some implementations, the UE 115-*b* may transmit an indication of a difference between the DOF 325 and the DOF 345 (for the beam 305-*a*), a difference between the DOF 335 and the DOF 355 (for the beam 310-*a*), and a difference between the DOF 340 and the DOF 345 (for the beam 310-*b*) along with the indication of the set of candidate beams.

Further, although the beam selection diagram 300 illustrates the selection of the beam 305-*a*, the beam 310-*a*, and the beam 310-*b* associated with the first port of the cell 360, the first port of the cell 365, and the second port of the cell 365, respectively, other scenarios in which the ports of the cells or the antenna modules 320 of the UE 115-*b* are configured for different DOFs may result in different beam selections by the UE 115-*b*, and such other scenarios do not exceed the scope of the present disclosure. Additionally, although the beam selection diagram 300 illustrates a DC deployment with two distinct cells, the beam selection diagram 300 also may be understood in a CA deployment in which the cell 360 and the cell 365 are two cells located on a same base station.

Figure 4:
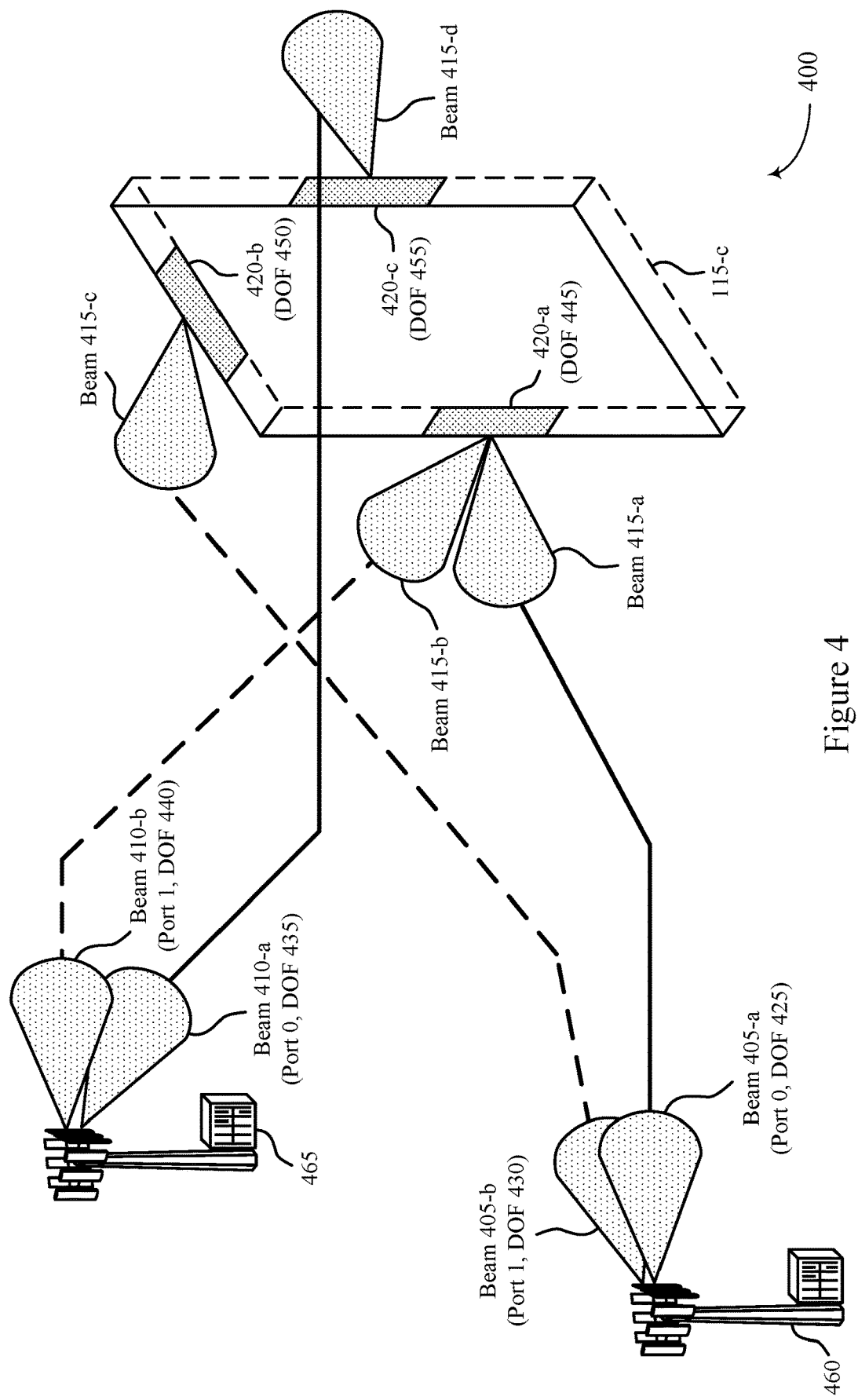

FIG. 4 illustrates an example of a beam selection diagram 400 that supports techniques for indicating beams in DC-CA systems based on a DOF mismatch. The beam selection diagram 400 illustrates the selection of beams at a cell 460 (which may be an example of or function as a PCell or a MCG), a cell 465 (which may be an example of or function as an SCell, a PSCell, or an SCG), and at a UE 115-*c* for communication between the UE 115-*c*, the cell 460, and the cell 465. In some examples, the UE 115-*c* may receive (from one of the cell 460, the cell 465, or from a serving base station) an indication of a DOF for each if not all ports of the cell 460 and the cell 465 and the UE 115-*c* may transmit an indication of a set of candidate beams that the cell 460 and the cell 465 may use for communicating with the UE 115-*c* based on a DOF mismatch between ports of the cells and antenna modules 420 of the UE 115-*c*.

For example, the cell 460 may operate multiple ports over a radio frequency spectrum band and may tune or configure each of the multiple ports to a DOF within the radio frequency spectrum band to increase or optimize performance (such as increasing received signal strength) for communication over the configured DOFs. In some examples, the cell 460 may operate a first port (a port 0) and a second port (a port 1) and the cell 460 may configure the first port with a DOF 425 and may configure the second port with a DOF 430. Similarly, the cell 465 may operate multiple ports over a radio frequency spectrum band and may tune or configure each of the multiple ports to a DOF within the radio frequency spectrum band to increase or optimize performance for communication over the configured DOFs. For example, the cell 465 may operate a first port (a port 0) and a second port (a port 1) and the cell 465 may configure the first port with a DOF 435 and may configure the second port with a DOF 440.

In some aspects, the beam selection diagram 400 may be described in the context of the cell 460 and the cell 465 operating over different radio frequency spectrum bands. For example, the cell 460 may operate over the FR2 radio frequency spectrum band and the cell 465 may operate over the FR4 radio frequency spectrum band and, as such, the DOF 425 and the DOF 430 may be within the FR2 radio frequency spectrum band and the DOF 435 and the DOF 440 may be within the FR4 radio frequency spectrum band. For instance, the cell 460 may configure the first port with a DOF of 39 GHz (such that the DOF 425=39 GHz) and may configure the second port with a DOF of 28 GHz (such that the DOF 430=28 GHz). Similarly, the cell 465 may configure the first port with a DOF of 57 GHz (such that the DOF 435=57 GHz) and may configure the second port with a DOF of 71 GHz (such that the DOF 440=71 GHz). As described herein, the cell 460, the cell 465, or a serving base station may transmit an indication of the DOF configured at each port of the cell 460 and the cell 465 to the UE 115-*c*.

The UE 115-*c* may operate multiple antenna modules 420, including an antenna module 420-*a*, an antenna module 420-*b*, and an antenna module 420-*c* over a radio frequency spectrum band (or over multiple radio frequency spectrum bands) and may tune or configure each of the multiple antenna modules 420 to a DOF within the radio frequency spectrum band (or within the multiple radio frequency spectrum bands) to increase or optimize performance for communication over the configured DOFs. For example, the UE 115-*c* may configure the antenna module 420-*a* with a DOF 445, may configure the antenna module 420-*b* with a DOF 450, and may configure the antenna module 420-*c* with a DOF 455. In some examples, such as in examples in which the cell 460 operates over the FR2 radio frequency spectrum band and the cell 465 operates over the FR4 radio frequency spectrum band, the UE 115-*c* may configure the antenna modules 420 of the UE 115-*c* such that the DOF 445, the DOF 450, and the DOF 455 are within either of the FR2 radio frequency spectrum band or the FR4 radio frequency spectrum band. For instance, the UE 115-*c* may configure the antenna module 420-*a* with a DOF of 30 GHz (such that the DOF 445=30 GHz), may configure the antenna module 420-*b* with a DOF of 57 GHz (such that the DOF 450=57 GHz), and may configure the antenna module 420-*c* with a DOF of 64 GHz (such that the DOF 455=64 GHz).

As such, in some examples, the UE 115-*c* may operate three antenna modules 420 with DOFs of 30 GHz, 57 GHz, and 64 GHz, the cell 460 may operate two ports with DOFs of 39 GHz and 28 GHz, and the cell 465 may operate two ports with DOFs of 57 GHz and 71 GHz. The cell 460 and the cell 465 may form one or more directional beams from each antenna port. For example, the cell 460 may form beams 405 from the ports of the cell 460, including a beam 405-*a* from the first port and a beam 405-*b* from the second port. Similarly, the cell 465 may form beams 410 from the ports of the cell 465, including a beam 410-*a* from the first port and a beam 410-*b* from the second port. Additionally, the UE 115-*c* may form one or more directional beams 415 from each antenna module 420 of the UE 115-*c*, including a beam 415-*a* and a beam 415-*b* from the antenna module 420-*a*, a beam 415-*c* from the antenna module 420-*b*, and a beam 415-*d* from the antenna module 420-*c*.

In some examples, such as in examples in which the UE 115-*c* attempts to synchronize with the cell 460 and the cell 465, the cells may each transmit synchronization signals, such as SSBs, via beams towards the UE 115-*c* and the UE 115-*c* may receive the SSBs via the beams at one or more of the antenna modules 420 of the UE 115-*c*. For example, the cell 460 may transmit one or more SSBs via the beams 405 over the two ports of the cell 460 at 39 GHz and 28 GHz and the cell 465 may transmit one or more SSBs via the beams 410 over the two ports of the cell 465 at 57 GHz and 71 GHz (such that the UE 115-*c* may receive four clusters from the cell 460 and the cell 465). The UE 115-*c* may receive or be configured with a mapping between sets of SSBs and ports, and the UE 115-*c* may use the mapping between the sets of SSBs and the ports and the indication of the DOF supported by each port to determine the DOF mismatch based on receiving an SSB at an antenna module 420 of the UE 115-*c* (an SSB corresponds to a port based on the mapping and the port corresponds to an indicated DOF). For example, the mapping may indicate that the first port of the cell 460 is associated with SSBs 1-8 and that the second port of the cell 460 is associated with SSBs 9-12 such that if the UE 115-*c* receives an SSB the UE 115-*c* may determine the port of the cell 460 from which the SSB was transmitted.

The UE 115-*c* may receive the SSBs transmitted via the beams 405 and the beams 410 from the cell 460 and the cell 465, respectively, and identify a set of candidate beams that the cell 460 and the cell 465 may use for communication with the UE 115-*c* (such as for transmission of communications to the UE 115-*c*, or for reception of communications from the UE 115-*c*, or both) based on which antenna module 420 of the UE 115-*c* receives the SSBs and based on the DOF mismatch between the transmitting port and the receiving antenna module 420 (beam selection may be module-specific at the UE 115-*c* and based on MCG or SCG transmissions). In some examples, the UE 115-*c* may receive an SSB transmitted via the beam 405-*a* at the antenna module 420-*a* using the beam 415-*a*, may receive an SSB transmitted via the beam 405-*b* at the antenna module 420-*b* using the beam 415-*c*, may receive an SSB transmitted via the beam 410-*a* at the antenna module 420-*c* using the beam 415-*d*, and may receive an SSB transmitted via the beam 410-*b* at the antenna module 420-*a* using the beam 415-*b*. In some aspects, the UE 115-*c* may receive an SSB at an antenna module 420 based on the orientations or relative locations of the cell 460, the cell 465, and the antenna modules 420 of the UE 115-*c*.

The UE 115-*c*, based on receiving the one or more SSBs transmitted via the beams 405 and the beams 410 from the cell 460 and the cell 465, respectively, may select a set of candidate beams from the beams 405 and the beams 410 based on the DOF mismatch between the port associated with the beams 405 and the beams 410 and the antenna module 420 that receives an SSB via the beams 405 and the beams 410. For example, at the antenna module 420-*a*, the UE 115-*c* may receive an SSB from the first port of the cell 460 via the beam 405-*a* using the beam 415-*a* and may receive an SSB from the second port of the cell 465 via the beam 410-*b* using the beam 415-*b*. In such examples, the UE 115-*c* may compare the DOF 425 of the first port of the cell 460 with the DOF 445 of the antenna module 420-*a* and may compare the DOF 440 of the second port of the cell 465 with the DOF 445 of the antenna module 420-*a* and, based on the comparison, may determine whether to select one or both of the beam 405-*a* or the beam 410-*b* as candidate beams.

In examples in which the first port of the cell 460 has a DOF 425 of 39 GHz, the second port of the cell 465 has a DOF 440 of 71 GHz, and the antenna module 420-*a* has a DOF 445 of 30 GHz, the UE 115-*c* may determine that the first port of the cell 460 has a DOF 425 within a threshold range from the DOF 445 of the antenna module 420-*a* and that the second port of the cell 465 has a DOF 440 outside of the threshold range from the DOF 445 of the antenna module 420-a. As such, the UE 115-c may select the beam 405-a as a candidate beam (as illustrated by a solid line) within the set of candidate beams that the cell 460 and the cell 465 may use for communication with the UE 115-c and may refrain from selecting the beam 410-b as a candidate beam (as illustrated by a dotted line). In other words, the difference between a DOF of 39 GHz and 30 GHz (9 GHz) may be within or smaller than a threshold DOF mismatch and the difference between a DOF of 71 GHz and 30 GHz (41 GHz) may exceed the threshold DOF mismatch.

For further example, at the antenna module 420-b, the UE 115-c may receive an SSB from the second port of the cell 460 via the beam 405-b using the beam 415-c. In such examples, the UE 115-c may compare the DOF 430 of the second port of the cell 460 with the DOF 450 of the antenna modules 420-b and, based on the comparison, may determine whether to select the beam 405-b as a candidate beam. In examples in which the second port of the cell 460 has a DOF 430 of 28 GHz and the antenna module 420-b has a DOF 450 of 57 GHz, the UE 115-c may determine that the second port of the cell 460 has a DOF 430 outside of the threshold range from the DOF 450 of the antenna module 420-b and the UE 115-c may refrain from selecting the beam 405-b as a candidate beam (as illustrated by a dotted line) within the set of candidate beams that the cell 460 and the cell 465 may use for communication with the UE 115-c. In other words, the difference between a DOF of 28 GHz and a DOF of 57 GHz (29 GHz) may exceed a threshold DOF mismatch and may result in communication failures if the UE 115-c and the cell 460 attempt to communicate with each other using such DOFs.

For further example, at the antenna module 420-c, the UE 115-c may receive an SSB from the first port of the cell 465 via the beam 410-a using the beam 415-d. In such examples, the UE 115-c may compare the DOF 435 of the first port of the cell 465 with the DOF 455 of the antenna module 420-c and, based on the comparison, may determine whether to select the beam 410-a as a candidate beam. In examples in which the first port of the cell 465 has a DOF 435 of 57 GHz and the antenna module 420-c has a DOF 455 of 64 GHz, the UE 115-c may determine that the first port of the cell 465 has a DOF 435 within the threshold range from the DOF 455 of the antenna module 420-c and the UE 115-c may select the beam 410-a as a candidate beam (as illustrated by a solid line) within the set of candidate beams that the cell 460 and the cell 465 may use for communication with the UE 115-c. In other words, the difference between a DOF of 57 GHz and a DOF of 64 GHz (7 GHz) may be within a threshold DOF mismatch.

The UE 115-c, based on selecting the beam 405-a and the beam 410-a as candidate beams within the set of candidate beams that the cell 460 and the cell 465 may use for communication with the UE 115-c, may transmit an indication of the selected beams (the set of candidate beams) to one or both of the cell 460 or the cell 465 or to a serving base station. In some examples, the UE 115-c may transmit the indication of the selected beams based on transmitting an indication of the ports of the cells associated with the selected beams (the ports from which the selected beams are formed). For example, the UE 115-c may indicate the first port of the cell 460 and the first port of the cell 465 to indicate the beam 405-a and the beam 410-a, respectively.

In some aspects, the UE 115-c may indicate the various ports associated with the selected beams based on transmitting an indication of a TCI state corresponding to the various ports. For example, the ports of the cells to which the UE 115-c may connect may each have a corresponding TCI state and the UE 115-c may indicate which ports the cells may use to communicate with the UE 115-c based on indicating one or more TCI states corresponding to one or more ports. Additionally, in some implementations, the UE 115-c may transmit an indication of the difference between the DOF 425 and the DOF 445 (for the beam 405-a) and the difference between the DOF 435 and the DOF 455 (for the beam 410-a) along with the set of candidate beams.

Further, although the beam selection diagram 400 illustrates the selection of the beam 405-a and the beam 410-a associated with the first port of the cell 460 and the first port of the cell 465, respectively, other scenarios in which the ports of the cells or the antenna modules 420 of the UE 115-c are configured for different DOFs may result in different beam selections by the UE 115-c, and such other scenarios do not exceed the scope of the present disclosure. Additionally, although the beam selection diagram 400 illustrates a DC deployment with two distinct cells, the beam selection diagram 400 also may be understood in a CA deployment in which the cell 460 and the cell 465 are two cells located on a same base station.

Figure 5:
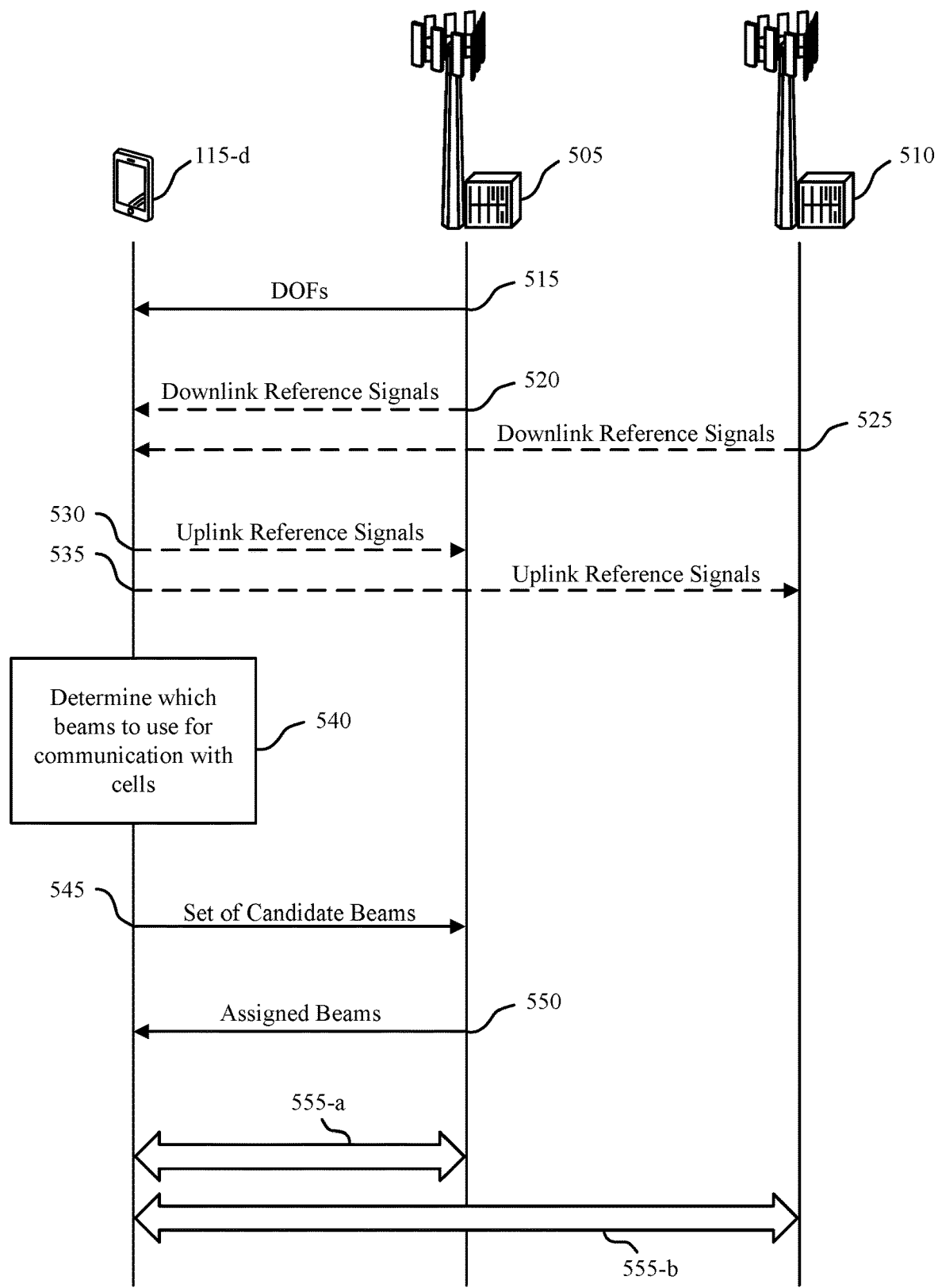
FIG. 5 illustrates an example of a process flow that supports techniques for indicating beams in DC-CA systems based on a DOF mismatch.

FIG. 5 illustrates an example of a process flow 500 that supports techniques for indicating beams in DC-CA systems based on a DOF mismatch. The process flow 500 illustrates communication between a UE 115-d (which may be an example of a UE 115, a UE 115-a, a UE 115-b, or a UE 115-c as described with reference to FIGS. 1-4, respectively), a cell 505 (which may function as a PCell or a MCG, such as a cell 360 or a cell 460 as described with reference to FIGS. 3 and 4, respectively), and a cell 510 (which may function as an SCell, a PSCell, or an SCG, such as a cell 365 or a cell 465 as described with reference to FIGS. 3 and 4, respectively). The UE 115-d may communicate with the cell 505 and the cell 510 in a CA or a DC deployment. In some aspects, the cell 505 and the cell 510 may operate over different radio frequency spectrum bands, such that the cell 505 may communicate over an FRx radio frequency spectrum band and the cell 510 may communicate over an FRy radio frequency spectrum band. In some examples, the UE 115-d may select which beams to use for communication between the UE 115-d and the cell 505 and for communication between the UE 115-d and the cell 510 based on DOF mismatches between antenna modules of the UE 115-d and antenna ports of the cell 505 and the cell 510.

At 515, the cell 505 (a first cell) may transmit, to the UE 115-d, an indication of a first DOF of one or more cells (one or more cells including the cell 505 and the cell 510). In some examples, the cell 505 may transmit an indication of multiple DOFs of the one or more cells, and may link each indicated DOF with an antenna port of one of the one or more cells. For example, the cell 505 may transmit an indication of a DOF for each port of the cell 505 and a DOF for each port of the cell 510. Further, although shown in FIG. 5 as being transmitted from cell (or base station) to UE, the UE 115-d may, in addition or in an alternative, transmit an indication of the DOFs of the UE 115-d to the cell 505 without exceeding the scope of the present disclosure.

At 520, the cell 505 may, in some implementations, transmit a number of downlink reference signals (such as SSBs or CSI-RSs, among other examples) via a number of beams from each antenna panel or each port of the cell 505. Similarly, at 525, the cell 510 may, in some implementations, transmit a number of downlink reference signals via a number of beams from each antenna panel or each port of the cell 510. In some examples, the cell 505 and the cell 510 may transmit their respective number of downlink reference signals as part of a beam training procedure (such as a beam training procedure within a synchronization or access procedure).

Additionally, or alternatively, at 530, the UE 115-*d* may, in some implementations, transmit a number of uplink reference signals (such as SRSs) via a number of beams from each if not all of the antenna modules of the UE 115-*d* to the cell 505. Similarly, at 535, the UE 115-*d* may, in some implementations, transmit a number of uplink reference signals via a number of beams from each if not all of the antenna modules of the UE 115-*d* to the cell 510. In some examples, the UE 115-*d* may transmit the number of uplink reference signals to the cell 505 and the cell 510 as part of a beam training procedure (such as a beam training procedure within a synchronization or access procedure).

At 540, the UE 115-*d* may select or otherwise determine which beams the cell 505 and the cell 510 may use for communication with the UE 115-*d* (such as for transmission of signals to the UE 115-*d*, or for reception of signals from the UE 115-*d*, or both) and which beams the UE 115-*d* may use for communication with the cell 505 and with the cell 510 (such as for transmission of signals by the UE 115-*d*, or for reception of signals by the UE 115-*d*, or both) based on the indication of the DOFs of each port of the cell 505 and the cell 510. Additionally, the UE 115-*d* may select or otherwise determine which beams the cell 505 and the cell 510 may use to communicate with the UE 115-*d* based on receiving the downlink reference signals from the cell 505 and the cell 510 or transmitting the uplink reference signals to the cell 505 and the cell 510. For example, the UE 115-*d* may determine which port of which cell an SSB is received from based on a cell ID and a mapping between SSBs and ports and, if the UE 115-*d* receives an SSB from a port of one of a cell having a DOF within a threshold DOF mismatch of a DOF of the antenna module of the UE 115-*d*, the UE 115-*d* may select a beam corresponding to the SSB from the port of the cell.

In other words, if the UE 115-*d* receives an SSB from a port of a cell having a first DOF at an antenna module having a second DOF and if the first DOF and the second DOF are within a threshold DOF mismatch (a threshold difference) of each other, the UE 115-*d* may select a beam carrying the SSB as a candidate beam for communication between the UE 115-*d* and the cell. In some examples, the UE 115-*d* may select which beams to use for communication between the UE 115-*d* and the cell 505 and between the UE 115-*d* and the cell 510 based on identifying that an out-of-band emission associated with a beam satisfies (is less than) a threshold out-of-band emission. Additional details relating to such a beam selection procedure that accounts for DOF mismatches between antenna ports of cells and antenna modules of the UE 115-*d* are described herein, including with reference to FIGS. 3 and 4.

At 545, the UE 115-*d* may transmit an indication of a set of candidate beams for communicating with one or both of the cell 505 or the cell 510 based on the mismatches between the DOFs associated with the cell 505 and the cell 510 and the DOFs associated with the UE 115-*d*. In some examples, the UE 115-*d* also may transmit an indication of the mismatches (the determined difference) associated with the set of candidate beams. As such, the cell 505 may provide some assistance for the UE 115-*d* in examples in which the UE 115-*d* selects one or more candidate beams that has a relatively large mismatch (such that if the only beam available was associated with a relatively large mismatch and the UE 115-*d* selected the beam because of a lack of other options).

At 550, the cell 505 may transmit a set of assigned beams (such as an indication of a set of assigned beams) for communicating with the cell 505 and the cell 510 in response to the transmitted indication of the set of candidate beams. For example, the cell 505 may transmit signaling indicating which beams of the set of candidate beams the cell 505 and the cell 510 may use to communicate with the UE 115-*d* (such as for transmission to or for reception from the UE 115-*d*). Additionally, or alternatively, the cell 505 may transmit signaling indicating which beams the UE 115-*d* may use to communicate with the cell 505 and the cell 510 (such as for transmission by or for reception by the UE 115-*d*).

At 555, the UE 115-*d* may communicate with one or both of the cell 505 or the cell 510 over the different radio frequency spectrum bands using the set of assigned beams. For example, at 555-*a*, the UE 115-*d* may communicate with the cell 505 over the FRx radio frequency spectrum band and, at 555-*b*, the UE 115-*d* may communicate with the cell 510 over the FRy radio frequency spectrum band. In some aspects, both the FRx and the FRy radio frequency spectrum bands may include ultra-wide bandwidth frequency bands. In some implementations of the present disclosure, the UE 115-*d* may communicate with one or both of the cell 505 and the cell 510 using beams (such as transmit beams, or receive beams, or both, including beams of the UE 115-*d*, beams of the cell 505, or beams of the cell 510, or any combination thereof) that are formed from antenna panels, ports, or modules that operate with similar DOFs (within a threshold range of each other) and may refrain from using beams from antenna panels, ports, or modules that operate with dissimilar DOFs (outside of the threshold range of each other).

Figure 6:
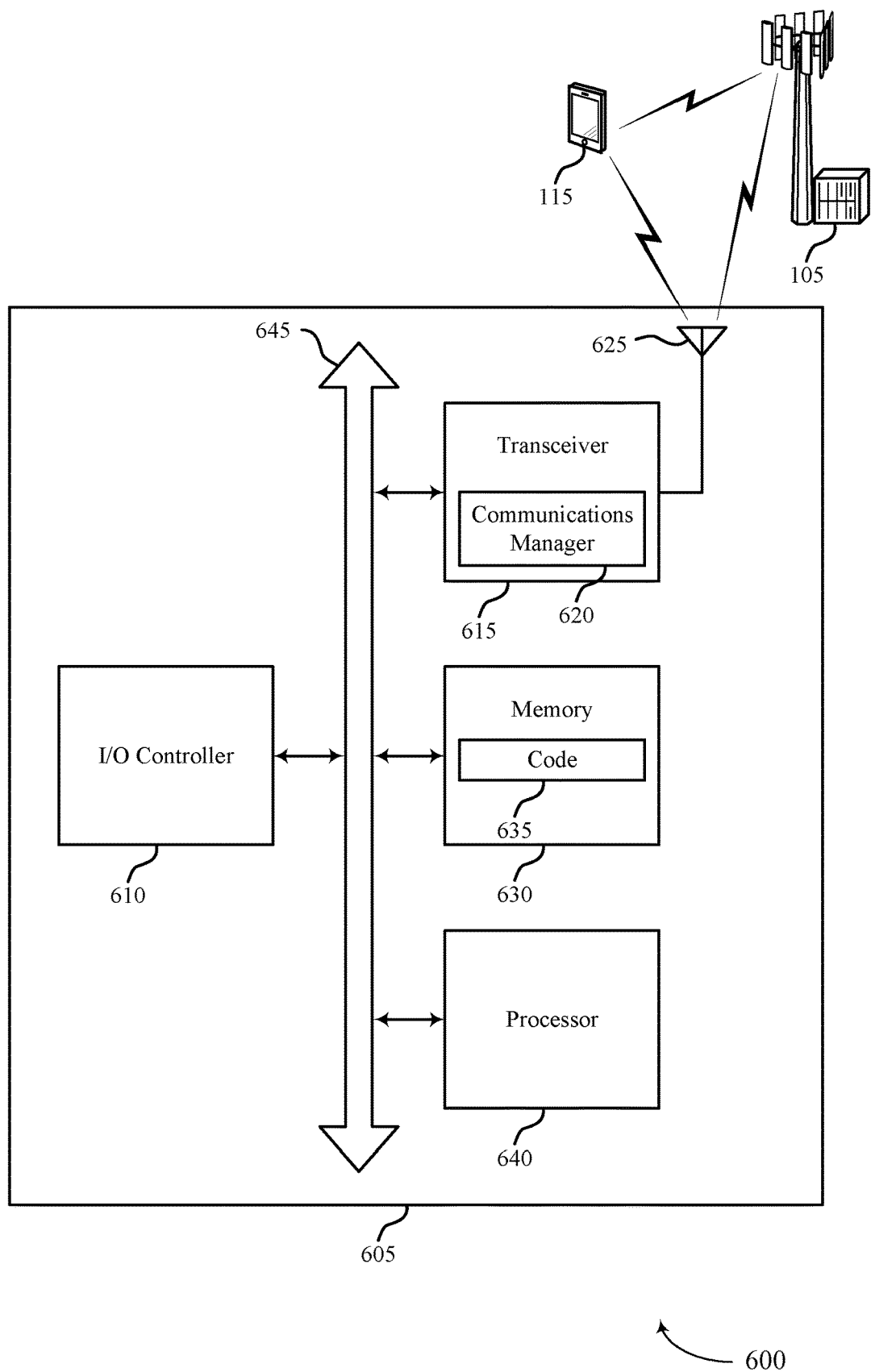
FIGS. 6 and 7 show block diagrams of example devices that support techniques for indicating beams in DC-CA systems based on a DOF mismatch.

FIG. 6 shows a block diagram 600 of an example device 605 that supports techniques for indicating beams in DC-CA systems based on a DOF mismatch. The device 605 may be an example of or include the components of a UE 115 as described herein. The device 605 may communicate wirelessly with one or more base stations 105, UEs 115, or any combination thereof. The device 605 may include components for bi-directional voice and data communications including components for transmitting and receiving communications, such as a communications manager 620, an input/output (I/O) controller 610, a transceiver 615, an antenna 625, a memory 630, code 635, and a processor 640. These components may be in electronic communication or otherwise coupled (such as operatively, communicatively, functionally, electronically, electrically) via one or more buses (such as a bus 645).

The communications manager 620 may support wireless communication at a UE in accordance with examples as disclosed herein. The communications manager 620 may be configured as or otherwise support a means for receiving an indication of a first DOF of one or more cells, the one or more cells operating over a set of multiple bands. In some examples, the communications manager 620 may be configured as or otherwise support a means for transmitting an indication of a set of candidate beams for communicating with the one or more cells based on a mismatch between the first DOF of the one or more cells and a second DOF associated with the UE. In some examples, the communications manager 620 may be configured as or otherwise support a means for receiving an indication of a set of assigned beams for communicating with the one or more cells in response to the transmitted indication of the set of candidate beams. In some examples, the communications manager 620 may be configured as or otherwise support a means for communicating with the one or more cells over the set of multiple bands using the set of assigned beams (such as for transmission or reception of communications by the device 605, or for transmission or reception of communications by the one or more cells).

In some examples, to support transmitting the indication of the set of candidate beams for communicating with the one or more cells, the communications manager 620 may be configured as or otherwise support a means for transmitting the indication of the set of candidate beams based on the mismatch between the first DOF of the one or more cells and the second DOF associated with the UE being within a threshold mismatch. In some examples, to support transmitting the indication of the set of candidate beams for communicating with the one or more cells, the communications manager 620 may be configured as or otherwise support a means for transmitting an indication of the mismatch between the first DOF of the one or more cells and the second DOF associated with the UE.

In some examples, to support transmitting the indication of the set of candidate beams for communicating with the one or more cells, the communications manager 620 may be configured as or otherwise support a means for transmitting the indication of the set of candidate beams for communicating with the one or more cells based on an out-of-band emission associated with the set of candidate beams satisfying a threshold on out-of-band emissions. In some examples, to support receiving the indication of the first DOF of the one or more cells, the communications manager 620 may be configured as or otherwise support a means for receiving an indication that a port of the one or more cells is configured with the first DOF.

In some examples, the communications manager 620 may be configured as or otherwise support a means for receiving, at an antenna module of the UE configured with the second DOF, a downlink reference signal via a beam of the set of candidate beams from the port configured with the first DOF, where transmitting the indication of the set of candidate beams is based on receiving the downlink reference signal via the beam from the port configured with the first DOF at the antenna module of the UE configured with the second DOF. In some examples, to support transmitting the indication of the set of candidate beams for communicating with the one or more cells, the communications manager 620 may be configured as or otherwise support a means for transmitting an indication of a TCI state corresponding to the port configured with the first DOF.

In some examples, to support communicating with the one or more cells using the set of assigned beams, the communications manager 620 may be configured as or otherwise support a means for receiving a downlink transmission from at least one of the one or more cells via at least one of the set of candidate beams using at least one of the set of assigned beams. In some examples, to support communicating with the one or more cells using the set of assigned beams, the communications manager 620 may be configured as or otherwise support a means for transmitting an uplink transmission to at least one of the one or more cells via at least one of the set of candidate beams using at least one of the set of assigned beams.

In some examples, the communications manager 620 may be configured as or otherwise support a means for selecting a set of antenna elements based on an MPE threshold, a bandwidth or component cost differential between a PA and an LNA on an uplink path and a downlink path, a power threshold on either the uplink path or the downlink path, or any combination thereof, where the at least one of the set of assigned beams is based on the set of antenna elements. In some examples, to support communicating with the one or more cells over the set of multiple bands using the set of assigned beams, the communications manager 620 may be configured as or otherwise support a means for communicating with the one or more cells according to a DC deployment or a CA deployment.

In some examples, the communications manager 620 may be configured as or otherwise support a means for transmitting an indication of the set of multiple bands over which the UE is capable of communicating with the one or more cells. In some examples, the UE operates in a CA deployment. In such examples, the one or more cells include at least a PCell and an SCell. In some other examples, the UE operates in a DC deployment. In such examples, the one or more cells include at least a PCell and a PSCell. In some examples, the set of multiple bands include ultra-wideband frequency bands.

The I/O controller 610 may manage input and output signals for the device 605. The I/O controller 610 also may manage peripherals not integrated into the device 605. In some examples, the I/O controller 610 may represent a physical connection or port to an external peripheral. In some examples, the I/O controller 610 may utilize an operating system such as iOS®, ANDROID®, MS-DOS®, MS-WINDOWS®, OS/2®, UNIX®, LINUX®, or another known operating system. Additionally, or alternatively, the I/O controller 610 may represent or interact with a modem, a keyboard, a mouse, a touchscreen, or a similar device. In some examples, the I/O controller 610 may be implemented as part of a processor, such as the processor 640. In some examples, a user may interact with the device 605 via the I/O controller 610 or via hardware components controlled by the I/O controller 610.

In some examples, the device 605 may include a single antenna 625. In some other examples, the device 605 may have more than one antenna 625, which may be capable of concurrently transmitting or receiving multiple wireless transmissions. The transceiver 615 may communicate bi-directionally, via the one or more antennas 625, wired, or wireless links as described herein. For example, the transceiver 615 may represent a wireless transceiver and may communicate bi-directionally with another wireless transceiver. The transceiver 615 also may include a modem to modulate the packets, to provide the modulated packets to one or more antennas 625 for transmission, and to demodulate packets received from the one or more antennas 625.

The memory 630 may include random access memory (RAM) and read-only memory (ROM). The memory 630 may store computer-readable, computer-executable code 635 including instructions that, when executed by the processor 640, cause the device 605 to perform various functions described herein. The code 635 may be stored in a non-transitory computer-readable medium such as system memory or another type of memory. In some examples, the code 635 may not be directly executable by the processor 640 but may cause a computer (such as when compiled and executed) to perform functions described herein. In some examples, the memory 630 may contain, among other things, a basic I/O system (BIOS) which may control basic hardware or software operation such as the interaction with peripheral components or devices.

In some implementations, the processor 640 may be a component of a processing system. A processing system may generally refer to a system or series of machines or components that receives inputs and processes the inputs to produce a set of outputs (which may be passed to other systems or components of, for example, a UE 115). For example, a processing system of a UE 115 may refer to a system including the various other components or subcomponents of a UE 115.

The processing system of the UE 115 may interface with other components of the UE 115 and may process information received or obtained from other components (such as inputs or signals) and output information to other components. For example, a chip or modem of the UE 115 may include a processing system, a first interface to receive or obtain information, and the first interface or a second interface to output, transmit, or provide information. In some implementations, the first interface may refer to an interface between the processing system of the chip or modem and a receiver, such that the UE 115 may receive information or signal inputs, and the information may be passed to the processing system. In some implementations, the second interface may refer to an interface between the processing system of the chip or modem and a transmitter, such that the UE 115 may transmit information output from the chip or modem. A person having ordinary skill in the art will readily recognize that the second interface also, or alternatively, may obtain or receive information or signal inputs, and the first interface also, or alternatively, may output, transmit, or provide information.

In some examples, the communications manager 620 may be configured to perform various operations (such as receiving, monitoring, transmitting) using or otherwise in cooperation with the transceiver 615, the one or more antennas 625, or any combination thereof. Although the communications manager 620 is illustrated as a separate component, in some examples, one or more functions described with reference to the communications manager 620 may be supported by or performed by the processor 640, the memory 630, the code 635, or any combination thereof. For example, the code 635 may include instructions executable by the processor 640 to cause the device 605 to perform various aspects of techniques for indicating beams in DC-CA systems based on a DOF mismatch as described herein, or the processor 640 and the memory 630 may be otherwise configured to perform or support such operations.

Figure 7:
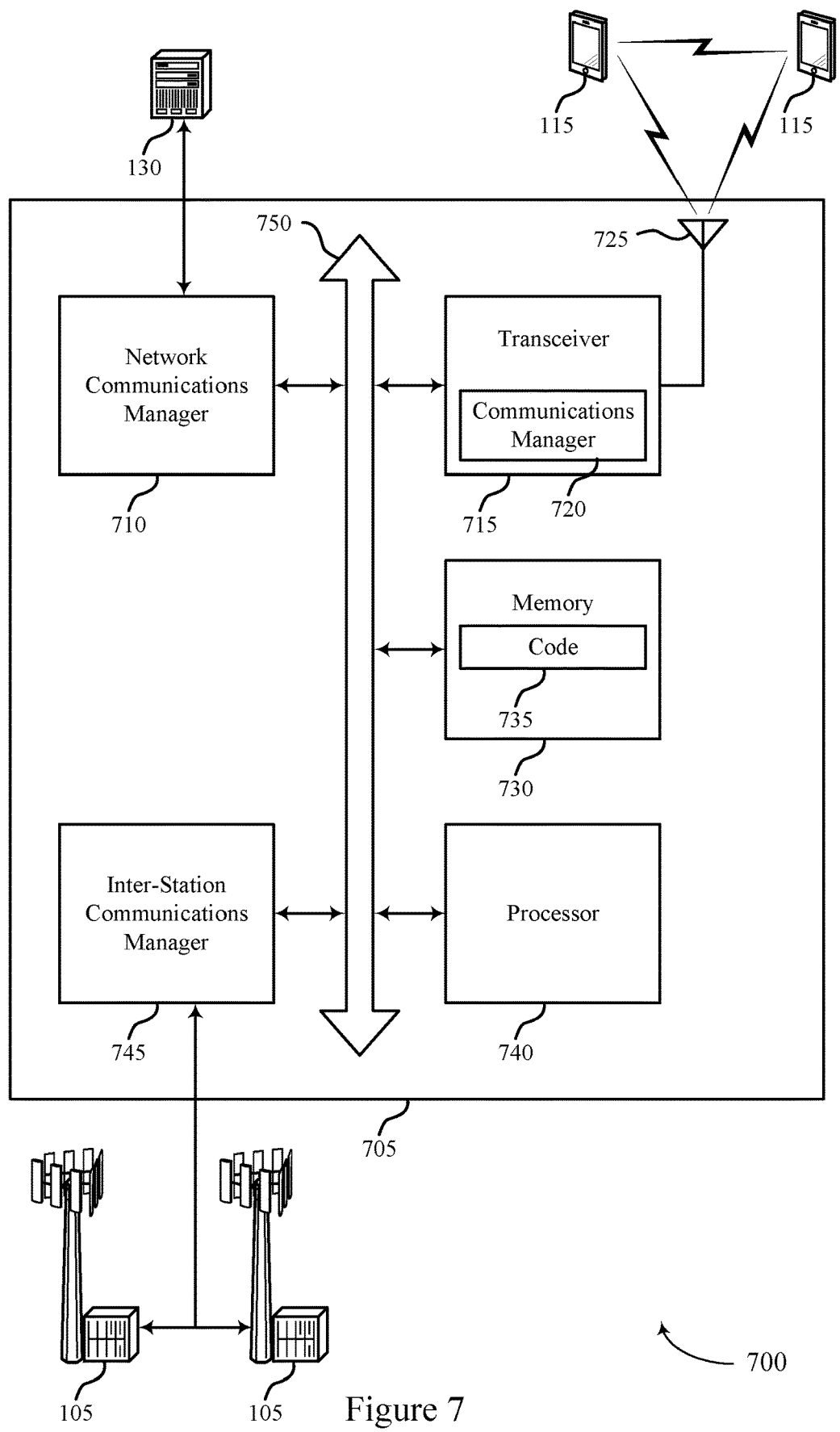

FIG. 7 shows a block diagram 700 of an example device 705 that supports techniques for indicating beams in DC-CA systems based on a DOF mismatch. The device 705 may be an example of or include the components of a cell or a base station 105 as described herein. The device 705 may communicate wirelessly with one or more base stations 105, UEs 115, or any combination thereof. The device 705 may include components for bi-directional voice and data communications including components for transmitting and receiving communications, such as a communications manager 720, a network communications manager 710, a transceiver 715, an antenna 725, a memory 730, code 735, a processor 740, and an inter-station communications manager 745. These components may be in electronic communication or otherwise coupled (such as operatively, communicatively, functionally, electronically, electrically) via one or more buses (such as a bus 750).

The communications manager 720 may support wireless communication at a first cell in accordance with examples as disclosed herein. The communications manager 720 may be configured as or otherwise support a means for transmitting, to a UE, an indication of a first DOF of one or more cells, the one or more cells operating over a set of multiple bands. In some examples, the communications manager 720 may be configured as or otherwise support a means for receiving, from the UE, an indication of a set of candidate beams for communicating with the UE based on a mismatch between the first DOF of the one or more cells and a second DOF associated with the UE. In some examples, the communications manager 720 may be configured as or otherwise support a means for transmitting, to the UE, an indication of a set of assigned beams for the UE to communicate with the one or more cells in response to the received indication of the set of candidate beams. In some examples, the communications manager 720 may be configured as or otherwise support a means for communicating with the UE via at least one of the set of assigned beams using at least one of the set of candidate beams.

In some examples, to support receiving the indication of the set of candidate beams for communicating with the UE, the communications manager 720 may be configured as or otherwise support a means for receiving the indication of the set of candidate beams based on the mismatch between the first DOF of the one or more cells and the second DOF associated with the UE being within a threshold mismatch. In some examples, to support receiving the indication of the set of candidate beams for communicating with the UE, the communications manager 720 may be configured as or otherwise support a means for receiving an indication of the mismatch between the first DOF of the one or more cells and the second DOF associated with the UE.

In some examples, to support receiving the indication of the set of candidate beams for communicating with the UE, the communications manager 720 may be configured as or otherwise support a means for receiving the indication of the set of candidate beams for communicating with the UE based on an out-of-band emission associated with the set of candidate beams satisfying a threshold on out-of-band emissions. In some examples, to support transmitting the indication of the first DOF of the one or more cells, the communications manager 720 may be configured as or otherwise support a means for transmitting an indication that a port of the first cell is configured with the first DOF.

In some examples, the communications manager 720 may be configured as or otherwise support a means for transmitting a downlink reference signal using a beam of the set of candidate beams from the port configured with the first DOF, where receiving the indication of the set of candidate beams is based on transmitting the downlink reference signal via the beam from the port configured with the first DOF. In some examples, to support receiving the indication of the set of candidate beams for communicating with the UE, the communications manager 720 may be configured as or otherwise support a means for receiving an indication of a TCI state corresponding to the port configured with the first DOF.

In some examples, to support communicating with the UE via the at least one of the set of assigned beams using the at least one of the set of candidate beams, the communications manager 720 may be configured as or otherwise support a means for transmitting, to the UE, a downlink transmission via the at least one of the set of assigned beams using the at least one of the set of candidate beams. In some examples, to support communicating with the UE via the at least one of the set of assigned beams using the at least one of the set of candidate beams, the communications manager 720 may be configured as or otherwise support a means for receiving, from the UE, an uplink transmission via the at least one of the set of assigned beams using the at least one of the set of candidate beams.

In some examples, to support communicating with the UE via the at least one of the set of assigned beams using the at least one of the set of candidate beams, the communications manager 720 may be configured as or otherwise support a means for communicating with the UE according to a DC deployment or a CA deployment. In some examples, the communications manager 720 may be configured as or otherwise support a means for receiving an indication of the set of multiple bands over which the UE is capable of communicating with the one or more cells.

In some examples, the first cell communicates with the UE in a CA deployment. In such examples, the one or more cells include at least a PCell and an SCell. In some other examples, the first cell communicates with the UE in a DC deployment. In such examples, the one or more cells include at least a PCell and a PSCell. In some examples, the set of multiple bands include ultra-wideband frequency bands.

The network communications manager 710 may manage communications with a core network 130 (such as via one or more wired backhaul links). For example, the network communications manager 710 may manage the transfer of data communications for client devices, such as one or more UEs 115.

In some examples, the device 705 may include a single antenna 725. In some other examples, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 also may include a modem to modulate the packets, to provide the modulated packets to one or more antennas 725 for transmission, and to demodulate packets received from the one or more antennas 725.

The memory 730 may include RAM and ROM. The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some examples, the code 735 may not be directly executable by the processor 740 but may cause a computer (such as when compiled and executed) to perform functions described herein. In some examples, the memory 730 may contain, among other things, a BIOS which may control basic hardware or software operation such as the interaction with peripheral components or devices.

In some implementations, the processor 740 may be a component of a processing system. A processing system may generally refer to a system or series of machines or components that receives inputs and processes the inputs to produce a set of outputs (which may be passed to other systems or components of, for example, a cell or a base station 105). For example, a processing system of a base station 105 may refer to a system including the various other components or subcomponents of a cell or a base station 105.

The processing system of the base station 105 may interface with other components of the base station 105 and may process information received from other components (such as inputs or signals) and output information to other components. For example, a chip or modem of the base station 105 may include a processing system, a first interface to receive or obtain information, and a second interface to output, transmit, or provide information. In some implementations, the first interface may refer to an interface between the processing system of the chip or modem and a receiver, such that the base station 105 may receive information or signal inputs, and the information may be passed to the processing system. In some implementations, the second interface may refer to an interface between the processing system of the chip or modem and a transmitter, such that the base station 105 may transmit information output from the chip or modem. A person having ordinary skill in the art will readily recognize that the second interface also, or alternatively, may obtain or receive information or signal inputs, and the first interface also, or alternatively, may output, transmit, or provide information.

The inter-station communications manager 745 may manage communications with other base stations 105, and may include a controller or scheduler for controlling communications with UEs 115 in cooperation with other base stations 105. For example, the inter-station communications manager 745 may coordinate scheduling for transmissions to UEs 115 for various interference mitigation techniques such as beamforming or joint transmission. In some examples, the inter-station communications manager 745 may provide an X2 interface within an LTE/LTE-A wireless communications network technology to provide communication between base stations 105.

In some examples, the communications manager 720 may be configured to perform various operations (such as receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for indicating beams in DC-CA systems based on a DOF mismatch as described herein, or the processor 740 and the memory 730 may be otherwise configured to perform or support such operations.

Figure 8:
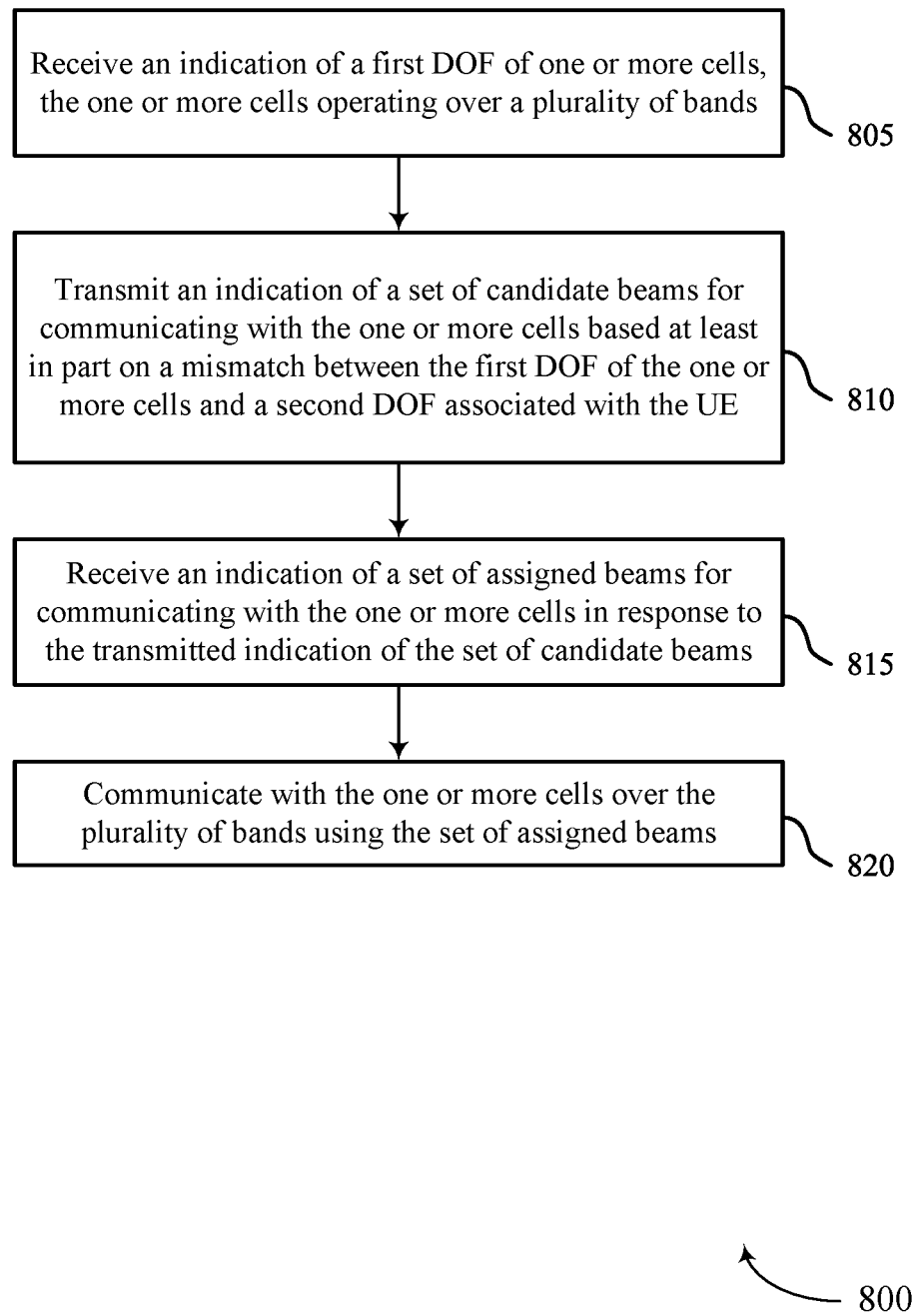
FIGS. 8 and 9 show flowcharts illustrating methods that support techniques for indicating beams in DC-CA systems based on a DOF mismatch.

FIG. 8 shows a flowchart illustrating a method 800 that supports techniques for indicating beams in DC-CA systems based on a DOF mismatch. The operations of the method 800 may be implemented by a UE or its components as described herein. For example, the operations of the method 800 may be performed by a UE 115 as described with reference to FIGS. 1-6. In some examples, a UE may execute a set of instructions to control the functional elements of the UE to perform the described functions. Additionally, or alternatively, the UE may perform aspects of the described functions using special-purpose hardware.

At 805, the method may include receiving an indication of a first DOF of one or more cells, the one or more cells operating over a plurality of bands. The operations of 805 may be performed in accordance with examples as disclosed herein.

In some examples, aspects of the operations of 805 may be performed by a communications manager 620 as described with reference to FIG. 6.

At 810, the method may include transmitting an indication of a set of candidate beams for communicating with the one or more cells based on a mismatch between the first DOF of the one or more cells and a second DOF associated with the UE. The operations of 810 may be performed in accordance with examples as disclosed herein. In some examples, aspects of the operations of 810 may be performed by a communications manager 620 as described with reference to FIG. 6.

At 815, the method may include receiving an indication of a set of assigned beams for communicating with the one or more cells in response to the transmitted indication of the set of candidate beams. The operations of 815 may be performed in accordance with examples as disclosed herein. In some examples, aspects of the operations of 815 may be performed by a communications manager 620 as described with reference to FIG. 6.

At 820, the method may include communicating with the one or more cells over the set of multiple bands using the set of assigned beams. The operations of 820 may be performed in accordance with examples as disclosed herein. In some examples, aspects of the operations of 820 may be performed by a communications manager 620 as described with reference to FIG. 6.

Figure 9:
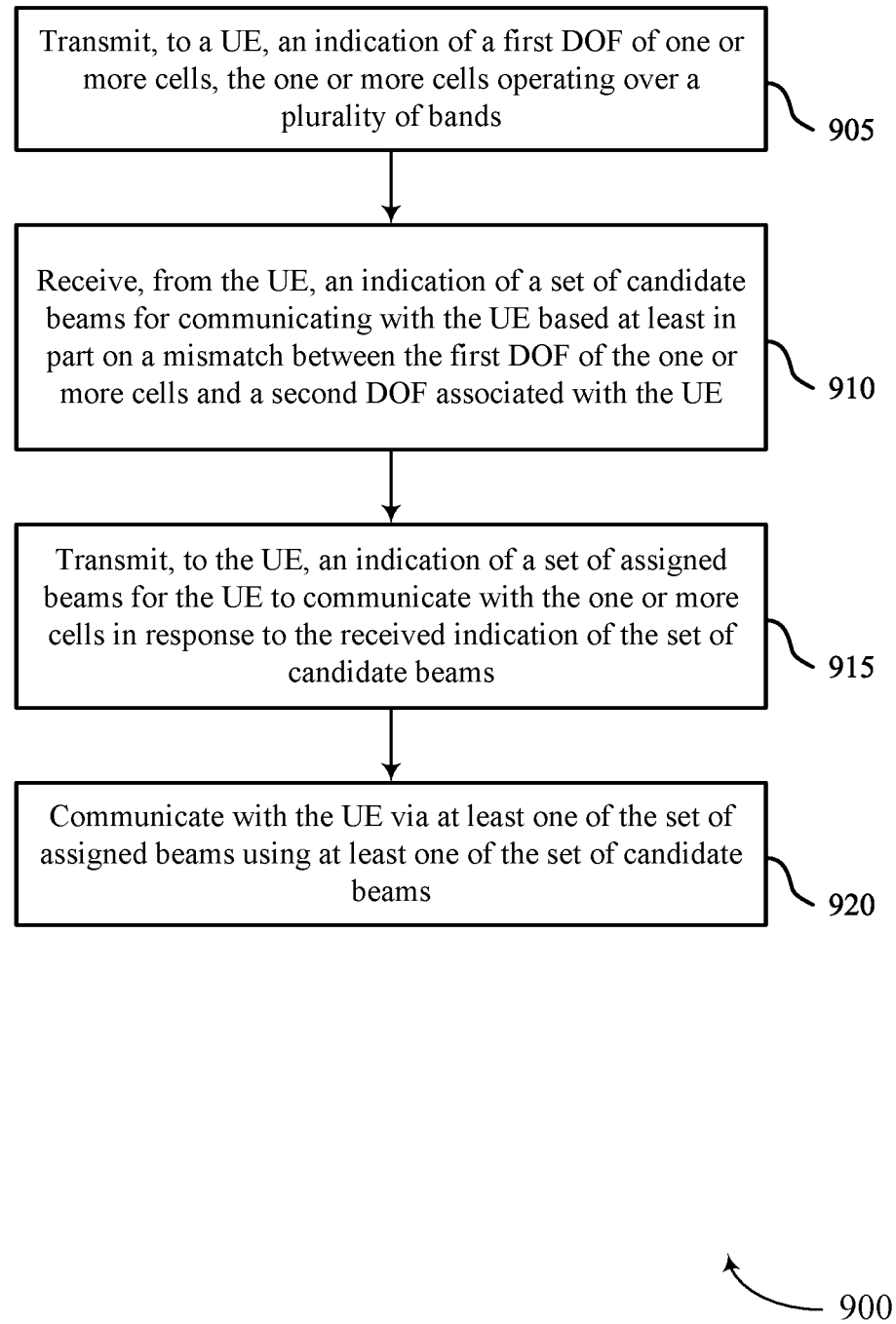

FIG. 9 shows a flowchart illustrating a method 900 that supports techniques for indicating beams in DC-CA systems based on a DOF mismatch. The operations of the method 900 may be implemented by a base station or its components as described herein. For example, the operations of the method 900 may be performed by a cell or a base station 105 as described with reference to FIGS. 1-5 and FIG. 7. In some examples, a base station may execute a set of instructions to control the functional elements of the base station to perform the described functions. Additionally, or alternatively, the base station may perform aspects of the described functions using special-purpose hardware.

At 905, the method may include transmitting, to a UE, an indication of a first DOF of one or more cells, the one or more cells operating over a plurality of bands. The operations of 905 may be performed in accordance with examples as disclosed herein. In some examples, aspects of the operations of 905 may be performed by a communications manager 720 as described with reference to FIG. 7.

At 910, the method may include receiving, from the UE, an indication of a set of candidate beams for communicating with the UE based on a mismatch between the first DOF of the one or more cells and a second DOF associated with the UE. The operations of 910 may be performed in accordance with examples as disclosed herein. In some examples, aspects of the operations of 910 may be performed by a communications manager 720 as described with reference to FIG. 7.

At 915, the method may include transmitting, to the UE, an indication of a set of assigned beams for the UE to communicate with the one or more cells in response to the received indication of the set of candidate beams. The operations of 915 may be performed in accordance with examples as disclosed herein. In some examples, aspects of the operations of 915 may be performed by a communications manager 720 as described with reference to FIG. 7.

At 920, the method may include communicating with the UE via at least one of the set of assigned beams using at least one of the set of candidate beams. The operations of 920 may be performed in accordance with examples as disclosed herein. In some examples, aspects of the operations of 920 may be performed by a communications manager 720 as described with reference to FIG. 7.

The following provides an overview of some aspects of the present disclosure:

Aspect 1: A method for wireless communication at a UE, including: receiving an indication of a first DOF of one or more cells, the one or more cells operating over a plurality of bands; transmitting an indication of a set of candidate beams for communicating with the one or more cells based at least in part on a mismatch between the first DOF of the one or more cells and a second DOF associated with the UE; receiving an indication of a set of assigned beams for communicating with the one or more cells in response to the transmitted indication of the set of candidate beams; and communicating with the one or more cells over the plurality of bands using the set of assigned beams.

Aspect 2: The method of aspect 1, where transmitting the indication of the set of candidate beams for communicating with the one or more cells includes: transmitting the indication of the set of candidate beams based at least in part on the mismatch between the first DOF of the one or more cells and the second DOF associated with the UE being within a threshold mismatch.

Aspect 3: The method of any of aspects 1-2, where transmitting the indication of the set of candidate beams for communicating with the one or more cells includes: transmitting an indication of the mismatch between the first DOF of the one or more cells and the second DOF associated with the UE.

Aspect 4: The method of any of aspects 1-3, where transmitting the indication of the set of candidate beams for communicating with the one or more cells includes: transmitting the indication of the set of candidate beams for communicating with the one or more cells based at least in part on an out-of-band emission associated with the set of candidate beams satisfying a threshold on out-of-band emissions.

Aspect 5: The method of any of aspects 1-4, where receiving the indication of the first DOF of the one or more cells includes: receiving an indication that a port of the one or more cells is configured with the first DOF.

Aspect 6: The method of aspect 5, further including: receiving, at an antenna module of the UE configured with the second DOF, a downlink reference signal via a beam of the set of candidate beams from the port configured with the first DOF, where transmitting the indication of the set of candidate beams is based at least in part on receiving the downlink reference signal via the beam from the port configured with the first DOF at the antenna module of the UE configured with the second DOF.

Aspect 7: The method of any of aspects 5-6, where transmitting the indication of the set of candidate beams for communicating with the one or more cells includes: transmitting an indication of a TCI state corresponding to the port configured with the first DOF.

Aspect 8: The method of any of aspects 1-7, where communicating with the one or more cells using the set of assigned beams includes: receiving a downlink transmission from at least one of the one or more cells via at least one of the set of candidate beams using at least one of the set of assigned beams.

Aspect 9: The method of any of aspects 1-8, where communicating with the one or more cells using the set of assigned beams includes: transmitting an uplink transmission to at least one of the one or more cells via at least one of the set of candidate beams using at least one of the set of assigned beams.

Aspect 10: The method of aspect 9, further including: selecting a set of antenna elements based at least in part on a MPE threshold, a bandwidth or component cost differential between a power amplifier and a low noise amplifier on an uplink path and a downlink path, a power threshold on either the uplink path or the downlink path, or any combination thereof, where the at least one of the set of assigned beams is based at least in part on the set of antenna elements.

Aspect 11: The method of any of aspects 1-10, where communicating with the one or more cells over the plurality of bands using the set of assigned beams includes: communicating with the one or more cells according to a DC deployment or a CA deployment.

Aspect 12: The method of any of aspects 1-11, further including: transmitting an indication of the plurality of bands over which the UE is capable of communicating with the one or more cells.

Aspect 13: The method of any of aspects 1-12, where the UE operates in a CA deployment; and the one or more cells include at least a PCell and an SCell.

Aspect 14: The method of any of aspects 1-12, where the UE operates in a DC deployment; and the one or more cells include at least a PCell and a PSCell.

Aspect 15: The method of any of aspects 1-14, where the plurality of bands include ultra-wideband frequency bands.

Aspect 16: A method for wireless communication at a first cell, including: transmitting, to a UE, an indication of a first DOF of one or more cells, the one or more cells operating over a plurality of bands; receiving, from the UE, an indication of a set of candidate beams for communicating with the UE based at least in part on a mismatch between the first DOF of the one or more cells and a second DOF associated with the UE; transmitting, to the UE, an indication of a set of assigned beams for the UE to communicate with the one or more cells in response to the received indication of the set of candidate beams; and communicating with the UE via at least one of the set of assigned beams using at least one of the set of candidate beams.

Aspect 17: The method of aspect 16, where receiving the indication of the set of candidate beams for communicating with the UE includes: receiving the indication of the set of candidate beams based at least in part on the mismatch between the first DOF of the one or more cells and the second DOF associated with the UE being within a threshold mismatch.

Aspect 18: The method of any of aspects 16-17, where receiving the indication of the set of candidate beams for communicating with the UE includes: receiving an indication of the mismatch between the first DOF of the one or more cells and the second DOF associated with the UE.

Aspect 19: The method of any of aspects 16-18, where receiving the indication of the set of candidate beams for communicating with the UE includes: receiving the indication of the set of candidate beams for communicating with the UE based at least in part on an out-of-band emission associated with the set of candidate beams satisfying a threshold on out-of-band emissions.

Aspect 20: The method of any of aspects 16-19, where transmitting the indication of the first DOF of the one or more cells includes: transmitting an indication that a port of the first cell is configured with the first DOF.

Aspect 21: The method of aspect 20, further including: transmitting a downlink reference signal using a beam of the set of candidate beams from the port configured with the first DOF, where receiving the indication of the set of candidate beams is based at least in part on transmitting the downlink reference signal via the beam from the port configured with the first DOF.

Aspect 22: The method of any of aspects 20-21, where receiving the indication of the set of candidate beams for communicating with the UE includes: receiving an indication of a TCI state corresponding to the port configured with the first DOF.

Aspect 23: The method of any of aspects 16-22, where communicating with the UE via the at least one of the set of assigned beams using the at least one of the set of candidate beams includes: transmitting, to the UE, a downlink transmission via the at least one of the set of assigned beams using the at least one of the set of candidate beams.

Aspect 24: The method of any of aspects 16-23, where communicating with the UE via the at least one of the set of assigned beams using the at least one of the set of candidate beams includes: receiving, from the UE, an uplink transmission via the at least one of the set of assigned beams using the at least one of the set of candidate beams.

Aspect 25: The method of any of aspects 16-24, where communicating with the UE via the at least one of the set of assigned beams using the at least one of the set of candidate beams includes: communicating with the UE according to a DC deployment or a CA deployment.

Aspect 26: The method of any of aspects 16-25, further including: receiving an indication of the plurality of bands over which the UE is capable of communicating with the one or more cells.

Aspect 27: The method of any of aspects 16-26, where the first cell communicates with the UE in a CA deployment; and the one or more cells include at least a PCell and an SCell.

Aspect 28: The method of any of aspects 16-26, where the first cell communicates with the UE in a DC deployment; and the one or more cells include at least a PCell and a PSCell.

Aspect 29: The method of any of aspects 16-28, where the plurality of bands include ultra-wideband frequency bands.

Aspect 30: An apparatus for wireless communication at a UE, including: a first interface configured to: obtain an indication of a first DOF of one or more cells, the one or more cells operating over a plurality of bands; where the first interface or a second interface is configured to: output an indication of a set of candidate beams for communicating with the one or more cells based at least in part on a mismatch between the first DOF of the one or more cells and a second DOF associated with the UE; obtain an indication of a set of assigned beams for communicating with the one or more cells in response to the outputted indication of the set of candidate beams; and communicate with the one or more cells over the plurality of bands using the set of assigned beams.

Aspect 31: The apparatus of aspect 30, where outputting the indication of the set of candidate beams for communicating with the one or more cells further includes: outputting the indication of the set of candidate beams based at least in part on the mismatch between the first DOF of the one or more cells and the second DOF associated with the UE being within a threshold mismatch.

Aspect 32: The apparatus of any of aspects 30-31, where outputting the indication of the set of candidate beams for communicating with the one or more cells further includes: outputting an indication of the mismatch between the first DOF of the one or more cells and the second DOF associated with the UE.

Aspect 33: The apparatus of any of aspects 30-32, where outputting the indication of the set of candidate beams for communicating with the one or more cells further includes: outputting the indication of the set of candidate beams for communicating with the one or more cells based at least in part on an out-of-band emission associated with the set of candidate beams satisfying a threshold on out-of-band emissions.

Aspect 34: The apparatus of any of aspects 30-33, where obtaining the indication of the first DOF of the one or more cells further includes: obtaining an indication that a port of the one or more cells is configured with the first DOF.

Aspect 35: The apparatus of aspect 34, where the first interface or the second interface is further configured to: obtain, at an antenna module of the UE configured with the second DOF, a downlink reference signal via a beam of the set of candidate beams from the port configured with the first DOF, where outputting the indication of the set of candidate beams is based at least in part on obtaining the downlink reference signal via the beam from the port configured with the first DOF at the antenna module of the UE configured with the second DOF.

Aspect 36: The apparatus of any of aspects 34-35, where outputting the indication of the set of candidate beams for communicating with the one or more cells further includes: outputting an indication of a TCI state corresponding to the port configured with the first DOF.

Aspect 37: The apparatus of any of aspects 30-36, where communicating with the one or more cells using the set of assigned beams further includes: obtaining a downlink transmission from at least one of the one or more cells via at least one of the set of candidate beams using at least one of the set of assigned beams.

Aspect 38: The apparatus of any of aspects 30-37, where communicating with the one or more cells using the set of assigned beams further includes: outputting an uplink transmission to at least one of the one or more cells via at least one of the set of candidate beams using at least one of the set of assigned beams.

Aspect 39: The apparatus of aspect 38, where a processing system is configured to: select a set of antenna elements based at least in part on a MPE threshold, a bandwidth or component cost differential between a power amplifier and a low noise amplifier on an uplink path and a downlink path, a power threshold on either the uplink path or the downlink path, or any combination thereof, where the at least one of the set of assigned beams is based at least in part on the set of antenna elements.

Aspect 40: The apparatus of any of aspects 30-39, where communicating with the one or more cells over the plurality of bands using the set of assigned beams further includes: communicating with the one or more cells according to a DC deployment or a CA deployment.

Aspect 41: The apparatus of any of aspects 30-40, where the first interface or the second interface is further configured to: output an indication of the plurality of bands over which the UE is capable of communicating with the one or more cells.

Aspect 42: The apparatus of any of aspects 30-41, where: the UE operates in a CA deployment; and the one or more cells include at least a PCell and an SCell.

Aspect 43: The apparatus of any of aspects 30-41, where: the UE operates in a DC deployment; and the one or more cells include at least a PCell and a PSCell.

Aspect 44: The apparatus of any of aspects 30-43, where the plurality of bands includes ultra-wideband frequency bands.

Aspect 45: An apparatus for wireless communication at a first cell, including: a first interface configured to: output, to a UE, an indication of a first DOF of one or more cells, the one or more cells operating over a plurality of bands; where the first interface or a second interface is configured to: obtain, from the UE, an indication of a set of candidate beams for communicating with the UE based at least in part on a mismatch between the first DOF of the one or more cells and a second DOF associated with the UE; output, to the UE, an indication of a set of assigned beams for the UE to communicate with the one or more cells in response to the obtained indication of the set of candidate beams; and communicate with the UE via at least one of the set of assigned beams using at least one of the set of candidate beams.

Aspect 46: The apparatus of aspect 45, where obtaining the indication of the set of candidate beams for communicating with the UE further includes: obtaining the indication of the set of candidate beams based at least in part on the mismatch between the first DOF of the one or more cells and the second DOF associated with the UE being within a threshold mismatch.

Aspect 47: The apparatus of any of aspects 45-46, where obtaining the indication of the set of candidate beams for communicating with the UE further includes: obtaining an indication of the mismatch between the first DOF of the one or more cells and the second DOF associated with the UE.

Aspect 48: The apparatus of any of aspects 45-47, where obtaining the indication of the set of candidate beams for communicating with the UE further includes: obtaining the indication of the set of candidate beams for communicating with the UE based at least in part on an out-of-band emission associated with the set of candidate beams satisfying a threshold on out-of-band emissions Aspect 49: The apparatus of any of aspects 45-48, where outputting the indication of the first DOF of the one or more cells further includes: outputting an indication that a port of the first cell is configured with the first DOF.

Aspect 50: The apparatus of aspect 49, where the first interface or the second interface is further configured to: output a downlink reference signal using a beam of the set of candidate beams from the port configured with the first DOF, where obtaining the indication of the set of candidate beams is based at least in part on outputting the downlink reference signal via the beam from the port configured with the first DOF.

Aspect 51: The apparatus of any of aspects 49-50, where obtaining the indication of the set of candidate beams for communicating with the UE further includes: obtaining an indication of a TCI state corresponding to the port configured with the first DOF.

Aspect 52: The apparatus of any of aspects 45-51, where communicating with the UE via the at least one of the set of assigned beams using the at least one of the set of candidate beams further includes: outputting, to the UE, a downlink transmission via the at least one of the set of assigned beams using the at least one of the set of candidate beams.

Aspect 53: The apparatus of any of aspects 45-52, where communicating with the UE via the at least one of the set of assigned beams using the at least one of the set of candidate beams further includes: obtaining, from the UE, an uplink transmission via the at least one of the set of assigned beams using the at least one of the set of candidate beams.

Aspect 54: The apparatus of any of aspects 45-53, where communicating with the UE via the at least one of the set of assigned beams using the at least one of the set of candidate beams further includes: communicating with the UE according to a DC deployment or a CA deployment.

Aspect 55: The apparatus of any of aspects 45-54, where the first interface or the second interface is configured to: obtain an indication of the plurality of bands over which the UE is capable of communicating with the one or more cells.

Aspect 56: The apparatus of any of aspects 45-55, where: the first cell communicates with the UE in a CA deployment; and the one or more cells include at least a PCell and an SCell.

Aspect 57: The apparatus of any of aspects 45-55, where: the first cell communicates with the UE in a DC deployment; and the one or more cells include at least a PCell and a PSCell.

Aspect 58: The apparatus of any of aspects 45-57, where the plurality of bands includes ultra-wideband frequency bands.

Aspect 59: An apparatus for wireless communication at a UE, including: a processor; memory coupled with the processor; and instructions stored in the memory and executable by the processor to cause the apparatus to: receive an indication of a first DOF of one or more cells, the one or more cells operating over a plurality of bands; transmit an indication of a set of candidate beams for communicating with the one or more cells based at least in part on a mismatch between the first DOF of the one or more cells and a second DOF associated with the UE; receive an indication of a set of assigned beams for communicating with the one or more cells in response to the transmitted indication of the set of candidate beams; and communicate with the one or more cells over the plurality of bands using the set of assigned beams.

Aspect 60: The apparatus of aspect 59, where the instructions to transmit the indication of the set of candidate beams for communicating with the one or more cells are executable by the processor to cause the apparatus to: transmit the indication of the set of candidate beams based at least in part on the mismatch between the first DOF of the one or more cells and the second DOF associated with the UE being within a threshold mismatch.

Aspect 61: The apparatus of any of aspects 59-60, where the instructions to transmit the indication of the set of candidate beams for communicating with the one or more cells are executable by the processor to cause the apparatus to: transmit an indication of the mismatch between the first DOF of the one or more cells and the second DOF associated with the UE.

Aspect 62: The apparatus of any of aspects 59-61, where the instructions to transmit the indication of the set of candidate beams for communicating with the one or more cells are executable by the processor to cause the apparatus to: transmit the indication of the set of candidate beams for communicating with the one or more cells based at least in part on an out-of-band emission associated with the set of candidate beams satisfying a threshold on out-of-band emissions.

Aspect 63: The apparatus of any of aspects 59-62, where the instructions to receive the indication of the first DOF of the one or more cells are executable by the processor to cause the apparatus to: receive an indication that a port of the one or more cells is configured with the first DOF.

Aspect 64: The apparatus of aspect 63, where the instructions are further executable by the processor to cause the apparatus to: receive, at an antenna module of the UE configured with the second DOF, a downlink reference signal via a beam of the set of candidate beams from the port configured with the first DOF, where transmitting the indication of the set of candidate beams is based at least in part on receiving the downlink reference signal via the beam from the port configured with the first DOF at the antenna module of the UE configured with the second DOF.

Aspect 65: The apparatus of any of aspects 63-64, where the instructions to transmit the indication of the set of candidate beams for communicating with the one or more cells are executable by the processor to cause the apparatus to: transmit an indication of a TCI state corresponding to the port configured with the first DOF.

Aspect 66: The apparatus of any of aspects 59-65, where the instructions to communicate with the one or more cells using the set of assigned beams are executable by the processor to cause the apparatus to: receive a downlink transmission from at least one of the one or more cells via at least one of the set of candidate beams using at least one of the set of assigned beams.

Aspect 67: The apparatus of any of aspects 59-66, where the instructions to communicate with the one or more cells using the set of assigned beams are executable by the processor to cause the apparatus to: transmit an uplink transmission to at least one of the one or more cells via at least one of the set of candidate beams using at least one of the set of assigned beams.

Aspect 68: The apparatus of aspect 67, where the instructions are further executable by the processor to cause the apparatus to: select a set of antenna elements based at least in part on a MPE threshold, a bandwidth or component cost differential between a power amplifier and a low noise amplifier on an uplink path and a downlink path, a power threshold on either the uplink path or the downlink path, or any combination thereof, where the at least one of the set of assigned beams is based at least in part on the set of antenna elements.

Aspect 69: The apparatus of any of aspects 59-68, where the instructions to communicate with the one or more cells over the plurality of bands using the set of assigned beams are executable by the processor to cause the apparatus to: communicate with the one or more cells according to a DC deployment or a CA deployment.

Aspect 70: The apparatus of any of aspects 59-69, where the instructions are further executable by the processor to cause the apparatus to: transmit an indication of the plurality of bands over which the UE is capable of communicating with the one or more cells.

Aspect 71: The apparatus of any of aspects 59-70, where the UE operates in a CA deployment; and the one or more cells include at least a PCell and an SCell.

Aspect 72: The apparatus of any of aspects 59-70, where the UE operates in a DC deployment; and the one or more cells include at least a PCell and a PSCell.

Aspect 73: The apparatus of any of aspects 59-72, where: the plurality of bands include ultra-wideband frequency bands.

Aspect 74: An apparatus for wireless communication at a first cell, including: a processor; memory coupled with the processor; and instructions stored in the memory and executable by the processor to cause the apparatus to: transmit, to a UE, an indication of a first DOF of one or more cells, the one or more cells operating over a plurality of bands; receive, from the UE, an indication of a set of candidate beams for communicating with the UE based at least in part on a mismatch between the first DOF of the one or more cells and a second DOF associated with the UE; transmit, to the UE, an indication of a set of assigned beams for the UE to communicate with the one or more cells in response to the received indication of the set of candidate beams; and communicate with the UE via at least one of the set of assigned beams using at least one of the set of candidate beams.

Aspect 75: The apparatus of aspect 74, where the instructions to receive the indication of the set of candidate beams for communicating with the UE are executable by the processor to cause the apparatus to: receive the indication of the set of candidate beams based at least in part on the mismatch between the first DOF of the one or more cells and the second DOF associated with the UE being within a threshold mismatch.

Aspect 76: The apparatus of any of aspects 74-75, where the instructions to receive the indication of the set of candidate beams for communicating with the UE are executable by the processor to cause the apparatus to: receive an indication of the mismatch between the first DOF of the one or more cells and the second DOF associated with the UE.

Aspect 77: The apparatus of any of aspects 74-76, where the instructions to receive the indication of the set of candidate beams for communicating with the UE are executable by the processor to cause the apparatus to: receive the indication of the set of candidate beams for communicating with the UE based at least in part on an out-of-band emission associated with the set of candidate beams satisfying a threshold on out-of-band emissions.

Aspect 78: The apparatus of any of aspects 74-77, where the instructions to transmit the indication of the first DOF of the one or more cells are executable by the processor to cause the apparatus to: transmit an indication that a port of the first cell is configured with the first DOF.

Aspect 79: The apparatus of aspect 78, where the instructions are further executable by the processor to cause the apparatus to: transmit a downlink reference signal using a beam of the set of candidate beams from the port configured with the first DOF, where receiving the indication of the set of candidate beams is based at least in part on transmitting the downlink reference signal via the beam from the port configured with the first DOF.

Aspect 80: The apparatus of any of aspects 78-79, where the instructions to receive the indication of the set of candidate beams for communicating with the UE are executable by the processor to cause the apparatus to: receive an indication of a TCI state corresponding to the port configured with the first DOF.

Aspect 81: The apparatus of any of aspects 74-80, where the instructions to communicate with the UE via the at least one of the set of assigned beams using the at least one of the set of candidate beams are executable by the processor to cause the apparatus to: transmit, to the UE, a downlink transmission via the at least one of the set of assigned beams using the at least one of the set of candidate beams.

Aspect 82: The apparatus of any of aspects 74-81, where the instructions to communicate with the UE via the at least one of the set of assigned beams using the at least one of the set of candidate beams are executable by the processor to cause the apparatus to: receive, from the UE, an uplink transmission via the at least one of the set of assigned beams using the at least one of the set of candidate beams.

Aspect 83: The apparatus of any of aspects 74-82, where the instructions to communicate with the UE via the at least one of the set of assigned beams using the at least one of the set of candidate beams are executable by the processor to cause the apparatus to: communicate with the UE according to a DC deployment or a CA deployment.

Aspect 84: The apparatus of any of aspects 74-83, where the instructions are further executable by the processor to cause the apparatus to: receive an indication of the plurality of bands over which the UE is capable of communicating with the one or more cells.

Aspect 85: The apparatus of any of aspects 74-84, where: the first cell communicates with the UE in a CA deployment; and the one or more cells include at least a PCell and an SCell.

Aspect 86: The apparatus of any of aspects 74-84, where: the first cell communicates with the UE in a DC deployment; and the one or more cells include at least a PCell and a PSCell.

Aspect 87: The apparatus of any of aspects 74-86, where: the plurality of bands include ultra-wideband frequency bands.

Aspect 88: An apparatus for wireless communication at a UE, including: means for receiving an indication of a first DOF of one or more cells, the one or more cells operating over a plurality of bands; means for transmitting an indication of a set of candidate beams for communicating with the one or more cells based at least in part on a mismatch between the first DOF of the one or more cells and a second DOF associated with the UE; means for receiving an indication of a set of assigned beams for communicating with the one or more cells in response to the transmitted indication of the set of candidate beams; and means for communicating with the one or more cells over the plurality of bands using the set of assigned beams.

Aspect 89: The apparatus of aspect 88, where the means for transmitting the indication of the set of candidate beams for communicating with the one or more cells include: means for transmitting the indication of the set of candidate beams based at least in part on the mismatch between the first DOF of the one or more cells and the second DOF associated with the UE being within a threshold mismatch.

Aspect 90: The apparatus of any of aspects 88-89, where the means for transmitting the indication of the set of candidate beams for communicating with the one or more cells include: means for transmitting an indication of the mismatch between the first DOF of the one or more cells and the second DOF associated with the UE.

Aspect 91: The apparatus of any of aspects 88-90, where the means for transmitting the indication of the set of candidate beams for communicating with the one or more cells include: means for transmitting the indication of the set of candidate beams for communicating with the one or more cells based at least in part on an out-of-band emission associated with the set of candidate beams satisfying a threshold on out-of-band emissions.

Aspect 92: The apparatus of any of aspects 88-91, where the means for receiving the indication of the first DOF of the one or more cells include: means for receiving an indication that a port of the one or more cells is configured with the first DOF.

Aspect 93: The apparatus of aspect 92, further including: means for receiving, at an antenna module of the UE configured with the second DOF, a downlink reference signal via a beam of the set of candidate beams from the port configured with the first DOF, where transmitting the indication of the set of candidate beams is based at least in part on receiving the downlink reference signal via the beam from the port configured with the first DOF at the antenna module of the UE configured with the second DOF.

Aspect 94: The apparatus of any of aspects 92-93, where the means for transmitting the indication of the set of candidate beams for communicating with the one or more cells include: means for transmitting an indication of a TCI state corresponding to the port configured with the first DOF.

Aspect 95: The apparatus of any of aspects 88-94, where the means for communicating with the one or more cells using the set of assigned beams include: means for receiving a downlink transmission from at least one of the one or more cells via at least one of the set of candidate beams using at least one of the set of assigned beams.

Aspect 96: The apparatus of any of aspects 88-95, where the means for communicating with the one or more cells using the set of assigned beams include: means for transmitting an uplink transmission to at least one of the one or more cells via at least one of the set of candidate beams using at least one of the set of assigned beams.

Aspect 97: The apparatus of aspect 96, further including: means for selecting a set of antenna elements based at least in part on a MPE threshold, a bandwidth or component cost differential between a power amplifier and a low noise amplifier on an uplink path and a downlink path, a power threshold on either the uplink path or the downlink path, or any combination thereof, where the at least one of the set of assigned beams is based at least in part on the set of antenna elements.

Aspect 98: The apparatus of any of aspects 88-97, where the means for communicating with the one or more cells over the plurality of bands using the set of assigned beams include: means for communicating with the one or more cells according to a DC deployment or a CA deployment.

Aspect 99: The apparatus of any of aspects 88-98, further including: means for transmitting an indication of the plurality of bands over which the UE is capable of communicating with the one or more cells.

Aspect 100: The apparatus of any of aspects 88-99, where the UE operates in a CA deployment; and the one or more cells include at least a PCell and an SCell.

Aspect 101: The apparatus of any of aspects 88-99, where the UE operates in a DC deployment; and the one or more cells include at least a PCell and a PSCell.

Aspect 102: The apparatus of any of aspects 88-101, where: the plurality of bands include ultra-wideband frequency bands.

Aspect 103: An apparatus for wireless communication at a first cell, including: means for transmitting, to a UE, an indication of a first DOF of one or more cells, the one or more cells operating over a plurality of bands; means for receiving, from the UE, an indication of a set of candidate beams for communicating with the UE based at least in part on a mismatch between the first DOF of the one or more cells and a second DOF associated with the UE; means for transmitting, to the UE, an indication of a set of assigned beams for the UE to communicate with the one or more cells in response to the received indication of the set of candidate beams; and means for communicating with the UE via at least one of the set of assigned beams using at least one of the set of candidate beams.

Aspect 104: The apparatus of aspect 103, where the means for receiving the indication of the set of candidate beams for communicating with the UE include: means for receiving the indication of the set of candidate beams based at least in part on the mismatch between the first DOF of the one or more cells and the second DOF associated with the UE being within a threshold mismatch.

Aspect 105: The apparatus of any of aspects 103-104, where the means for receiving the indication of the set of candidate beams for communicating with the UE include: means for receiving an indication of the mismatch between the first DOF of the one or more cells and the second DOF associated with the UE.

Aspect 106: The apparatus of any of aspects 103-105, where the means for receiving the indication of the set of candidate beams for communicating with the UE include: means for receiving the indication of the set of candidate beams for communicating with the UE based at least in part on an out-of-band emission associated with the set of candidate beams satisfying a threshold on out-of-band emissions.

Aspect 107: The apparatus of any of aspects 103-106, where the means for transmitting the indication of the first DOF of the one or more cells include: means for transmitting an indication that a port of the first cell is configured with the first DOF.

Aspect 108: The apparatus of aspect 107, further including: means for transmitting a downlink reference signal using a beam of the set of candidate beams from the port configured with the first DOF, where receiving the indication of the set of candidate beams is based at least in part on transmitting the downlink reference signal via the beam from the port configured with the first DOF.

Aspect 109: The apparatus of any of aspects 107-108, where the means for receiving the indication of the set of candidate beams for communicating with the UE include: means for receiving an indication of a TCI state corresponding to the port configured with the first DOF.

Aspect 110: The apparatus of any of aspects 103-109, where the means for communicating with the UE via the at least one of the set of assigned beams using the at least one of the set of candidate beams include: means for transmitting, to the UE, a downlink transmission via the at least one of the set of assigned beams using the at least one of the set of candidate beams.

Aspect 111: The apparatus of any of aspects 103-110, where the means for communicating with the UE via the at least one of the set of assigned beams using the at least one of the set of candidate beams include: means for receiving, from the UE, an uplink transmission via the at least one of the set of assigned beams using the at least one of the set of candidate beams.

Aspect 112: The apparatus of any of aspects 103-111, where the means for communicating with the UE via the at least one of the set of assigned beams using the at least one of the set of candidate beams include: means for communicating with the UE according to a DC deployment or a CA deployment.

Aspect 113: The apparatus of any of aspects 103-112, further including: means for receiving an indication of the plurality of bands over which the UE is capable of communicating with the one or more cells.

Aspect 114: The apparatus of any of aspects 103-113, where: the first cell communicates with the UE in a CA deployment; and the one or more cells include at least a PCell and an SCell.

Aspect 115: The apparatus of any of aspects 103-113, where: the first cell communicates with the UE in a DC deployment; and the one or more cells include at least a PCell and a PSCell.

Aspect 116: The apparatus of any of aspects 103-115, where: the plurality of bands include ultra-wideband frequency bands.

Aspect 117: A non-transitory computer-readable medium storing code for wireless communication at a UE, the code including instructions executable by a processor to: receive an indication of a first DOF of one or more cells, the one or more cells operating over a plurality of bands; transmit an indication of a set of candidate beams for communicating with the one or more cells based at least in part on a mismatch between the first DOF of the one or more cells and a second DOF associated with the UE; receive an indication of a set of assigned beams for communicating with the one or more cells in response to the transmitted indication of the set of candidate beams; and communicate with the one or more cells over the plurality of bands using the set of assigned beams.

Aspect 118: The non-transitory computer-readable medium of aspect 117, where the instructions to transmit the indication of the set of candidate beams for communicating with the one or more cells are executable by the processor to: transmit the indication of the set of candidate beams based at least in part on the mismatch between the first DOF of the one or more cells and the second DOF associated with the UE being within a threshold mismatch.

Aspect 119: The non-transitory computer-readable medium of any of aspects 117-118, where the instructions to transmit the indication of the set of candidate beams for communicating with the one or more cells are executable by the processor to: transmit an indication of the mismatch between the first DOF of the one or more cells and the second DOF associated with the UE.

Aspect 120: The non-transitory computer-readable medium of any of aspects 117-119, where the instructions to transmit the indication of the set of candidate beams for communicating with the one or more cells are executable by the processor to: transmit the indication of the set of candidate beams for communicating with the one or more cells based at least in part on an out-of-band emission associated with the set of candidate beams satisfying a threshold on out-of-band emissions.

Aspect 121: The non-transitory computer-readable medium of any of aspects 117-120, where the instructions to receive the indication of the first DOF of the one or more cells are executable by the processor to: receive an indication that a port of the one or more cells is configured with the first DOF.

Aspect 122: The non-transitory computer-readable medium of aspect 121, where the instructions are further executable by the processor to: receive, at an antenna module of the UE configured with the second DOF, a downlink reference signal via a beam of the set of candidate beams from the port configured with the first DOF, where transmitting the indication of the set of candidate beams is based at least in part on receiving the downlink reference signal via the beam from the port configured with the first DOF at the antenna module of the UE configured with the second DOF.

Aspect 123: The non-transitory computer-readable medium of any of aspects 121-122, where the instructions to transmit the indication of the set of candidate beams for communicating with the one or more cells are executable by the processor to: transmit an indication of a TCI state corresponding to the port configured with the first DOF.

Aspect 124: The non-transitory computer-readable medium of any of aspects 117-123, where the instructions to communicate with the one or more cells using the set of assigned beams are executable by the processor to: receive a downlink transmission from at least one of the one or more cells via at least one of the set of candidate beams using at least one of the set of assigned beams.

Aspect 125: The non-transitory computer-readable medium of any of aspects 117-124, where the instructions to communicate with the one or more cells using the set of assigned beams are executable by the processor to: transmit an uplink transmission to at least one of the one or more cells via at least one of the set of candidate beams using at least one of the set of assigned beams.

Aspect 126: The non-transitory computer-readable medium of aspect 125, where the instructions are further executable by the processor to: select a set of antenna elements based at least in part on a MPE threshold, a bandwidth or component cost differential between a power amplifier and a low noise amplifier on an uplink path and a downlink path, a power threshold on either the uplink path or the downlink path, or any combination thereof, where the at least one of the set of assigned beams is based at least in part on the set of antenna elements.

Aspect 127: The non-transitory computer-readable medium of any of aspects 117-126, where the instructions to communicate with the one or more cells over the plurality of bands using the set of assigned beams are executable by the processor to: communicate with the one or more cells according to a DC deployment or a CA deployment.

Aspect 128: The non-transitory computer-readable medium of any of aspects 117-127, where the instructions are further executable by the processor to: transmit an indication of the plurality of bands over which the UE is capable of communicating with the one or more cells.

Aspect 129: The non-transitory computer-readable medium of any of aspects 117-128, where the UE operates in a CA deployment; and the one or more cells include at least a PCell and an SCell.

Aspect 130: The non-transitory computer-readable medium of any of aspects 117-128, where the UE operates in a DC deployment; and the one or more cells include at least a PCell and a PSCell.

Aspect 131: The non-transitory computer-readable medium of any of aspects 117-130, where: the plurality of bands include ultra-wideband frequency bands.

Aspect 132: A non-transitory computer-readable medium storing code for wireless communication at a first cell, the code including instructions executable by a processor to: transmit, to a UE, an indication of a first DOF of one or more cells, the one or more cells operating over a plurality of bands; receive, from the UE, an indication of a set of candidate beams for communicating with the UE based at least in part on a mismatch between the first DOF of the one or more cells and a second DOF associated with the UE; transmit, to the UE, an indication of a set of assigned beams for the UE to communicate with the one or more cells in response to the received indication of the set of candidate beams; and communicate with the UE via at least one of the set of assigned beams using at least one of the set of candidate beams.

Aspect 133: The non-transitory computer-readable medium of aspect 132, where the instructions to receive the indication of the set of candidate beams for communicating with the UE are executable by the processor to: receive the indication of the set of candidate beams based at least in part on the mismatch between the first DOF of the one or more cells and the second DOF associated with the UE being within a threshold mismatch.

Aspect 134: The non-transitory computer-readable medium of any of aspects 132-133, where the instructions to receive the indication of the set of candidate beams for communicating with the UE are executable by the processor to: receive an indication of the mismatch between the first DOF of the one or more cells and the second DOF associated with the UE.

Aspect 135: The non-transitory computer-readable medium of any of aspects 132-134, where the instructions to receive the indication of the set of candidate beams for communicating with the UE are executable by the processor to: receive the indication of the set of candidate beams for communicating with the UE based at least in part on an out-of-band emission associated with the set of candidate beams satisfying a threshold on out-of-band emissions.

Aspect 136: The non-transitory computer-readable medium of any of aspects 132-135, where the instructions to transmit the indication of the first DOF of the one or more cells are executable by the processor to: transmit an indication that a port of the first cell is configured with the first DOF.

Aspect 137: The non-transitory computer-readable medium of aspect 136, where the instructions are further executable by the processor to: transmit a downlink reference signal using a beam of the set of candidate beams from the port configured with the first DOF, where receiving the indication of the set of candidate beams is based at least in part on transmitting the downlink reference signal via the beam from the port configured with the first DOF.

Aspect 138: The non-transitory computer-readable medium of any of aspects 136-137, where the instructions to receive the indication of the set of candidate beams for communicating with the UE are executable by the processor to: receive an indication of a TCI state corresponding to the port configured with the first DOF.

Aspect 139: The non-transitory computer-readable medium of any of aspects 132-138, where the instructions to communicate with the UE via the at least one of the set of assigned beams using the at least one of the set of candidate beams are executable by the processor to: transmit, to the UE, a downlink transmission via the at least one of the set of assigned beams using the at least one of the set of candidate beams.

Aspect 140: The non-transitory computer-readable medium of any of aspects 132-139, where the instructions to communicate with the UE via the at least one of the set of assigned beams using the at least one of the set of candidate beams are executable by the processor to: receive, from the UE, an uplink transmission via the at least one of the set of assigned beams using the at least one of the set of candidate beams.

Aspect 141: The non-transitory computer-readable medium of any of aspects 132-140, where the instructions to communicate with the UE via the at least one of the set of assigned beams using the at least one of the set of candidate beams are executable by the processor to: communicate with the UE according to a DC deployment or a CA deployment.

Aspect 142: The non-transitory computer-readable medium of any of aspects 132-141, where the instructions are further executable by the processor to: receive an indication of the plurality of bands over which the UE is capable of communicating with the one or more cells.

Aspect 143: The non-transitory computer-readable medium of any of aspects 132-142, where: the first cell communicates with the UE in a CA deployment; and the one or more cells include at least a PCell and an SCell.

Aspect 144: The non-transitory computer-readable medium of any of aspects 132-142, where: the first cell communicates with the UE in a DC deployment; and the one or more cells include at least a PCell and a PSCell.

Aspect 145: The non-transitory computer-readable medium of any of aspects 132-144, where: the plurality of bands include ultra-wideband frequency bands.

Aspect 146: An apparatus for wireless communication at a UE, including: a controller associated with a memory device, where the controller is configured to cause the apparatus to: receive an indication of a first DOF of one or more cells, the one or more cells operating over a plurality of bands; transmit an indication of a set of candidate beams for communicating with the one or more cells based at least in part on a mismatch between the first DOF of the one or more cells and a second DOF associated with the UE; receive an indication of a set of assigned beams for communicating with the one or more cells in response to the transmitted indication of the set of candidate beams; and communicate with the one or more cells over the plurality of bands using the set of assigned beams.

Aspect 147: The apparatus of aspect 146, where transmitting the indication of the set of candidate beams for communicating with the one or more cells is configured to cause the apparatus to: transmit the indication of the set of candidate beams based at least in part on the mismatch between the first DOF of the one or more cells and the second DOF associated with the UE being within a threshold mismatch.

Aspect 148: The apparatus of any of aspects 146-147, where transmitting the indication of the set of candidate beams for communicating with the one or more cells is configured to cause the apparatus to: transmit an indication of the mismatch between the first DOF of the one or more cells and the second DOF associated with the UE.

Aspect 149: The apparatus of any of aspects 146-148, where transmitting the indication of the set of candidate beams for communicating with the one or more cells is configured to cause the apparatus to: transmit the indication of the set of candidate beams for communicating with the one or more cells based at least in part on an out-of-band emission associated with the set of candidate beams satisfying a threshold on out-of-band emissions.

Aspect 150: The apparatus of any of aspects 146-149, where receiving the indication of the first DOF of the one or more cells is configured to cause the apparatus to: receive an indication that a port of the one or more cells is configured with the first DOF.

Aspect 151: The apparatus of aspect 150, where the controller is further configured to cause the apparatus to: receive, at an antenna module of the UE configured with the second DOF, a downlink reference signal via a beam of the set of candidate beams from the port configured with the first DOF, where transmitting the indication of the set of candidate beams is based at least in part on receiving the downlink reference signal via the beam from the port configured with the first DOF at the antenna module of the UE configured with the second DOF.

Aspect 152: The apparatus of any of aspects 150-151, where transmitting the indication of the set of candidate beams for communicating with the one or more cells is configured to cause the apparatus to: transmit an indication of a TCI state corresponding to the port configured with the first DOF.

Aspect 153: The apparatus of any of aspects 146-152, where communicating with the one or more cells using the set of assigned beams is configured to cause the apparatus to: receive a downlink transmission from at least one of the one or more cells via at least one of the set of candidate beams using at least one of the set of assigned beams.

Aspect 154: The apparatus of any of aspects 146-153, where communicating with the one or more cells using the set of assigned beams is configured to cause the apparatus to: transmit an uplink transmission to at least one of the one or more cells via at least one of the set of candidate beams using at least one of the set of assigned beams.

Aspect 155: The apparatus of aspect 154, where the controller is further configured to cause the apparatus to: select a set of antenna elements based at least in part on a MPE threshold, a bandwidth or component cost differential between a power amplifier and a low noise amplifier on an uplink path and a downlink path, a power threshold on either the uplink path or the downlink path, or any combination thereof, where the at least one of the set of assigned beams is based at least in part on the set of antenna elements.

Aspect 156: The apparatus of any of aspects 146-155, where communicating with the one or more cells over the plurality of bands using the set of assigned beams is configured to cause the apparatus to: communicate with the one or more cells according to a DC deployment or a CA deployment.

Aspect 157: The apparatus of any of aspects 146-156, where the controller is further configured to cause the apparatus to: transmit an indication of the plurality of bands over which the UE is capable of communicating with the one or more cells.

Aspect 158: The apparatus of any of aspects 146-157, where the UE operates in a CA deployment; and the one or more cells include at least a PCell and an SCell.

Aspect 159: The apparatus of any of aspects 146-157, where the UE operates in a DC deployment; and the one or more cells include at least a PCell and a PSCell.

Aspect 160: The apparatus of any of aspects 146-159, where: the plurality of bands include ultra-wideband frequency bands.

Aspect 161: An apparatus for wireless communication at a first cell, including: a controller associated with a memory device, where the controller is configured to cause the apparatus to: transmit, to a UE, an indication of a first DOF of one or more cells, the one or more cells operating over a plurality of bands; receive, from the UE, an indication of a set of candidate beams for communicating with the UE based at least in part on a mismatch between the first DOF of the one or more cells and a second DOF associated with the UE; transmit, to the UE, an indication of a set of assigned beams for the UE to communicate with the one or more cells in response to the received indication of the set of candidate beams; and communicate with the UE via at least one of the set of assigned beams using at least one of the set of candidate beams.

Aspect 162: The apparatus of aspect 161, where receiving the indication of the set of candidate beams for communicating with the UE is configured to cause the apparatus to: receive the indication of the set of candidate beams based at least in part on the mismatch between the first DOF of the one or more cells and the second DOF associated with the UE being within a threshold mismatch.

Aspect 163: The apparatus of any of aspects 161-162, where receiving the indication of the set of candidate beams for communicating with the UE is configured to cause the apparatus to: receive an indication of the mismatch between the first DOF of the one or more cells and the second DOF associated with the UE.

Aspect 164: The apparatus of any of aspects 161-163, where receiving the indication of the set of candidate beams for communicating with the UE is configured to cause the apparatus to: receive the indication of the set of candidate beams for communicating with the UE based at least in part on an out-of-band emission associated with the set of candidate beams satisfying a threshold on out-of-band emissions.

Aspect 165: The apparatus of any of aspects 161-164, where transmitting the indication of the first DOF of the one or more cells is configured to cause the apparatus to: transmit an indication that a port of the first cell is configured with the first DOF.

Aspect 166: The apparatus of aspect 165, where the controller is further configured to cause the apparatus to: transmit a downlink reference signal using a beam of the set of candidate beams from the port configured with the first DOF, where receiving the indication of the set of candidate beams is based at least in part on transmitting the downlink reference signal via the beam from the port configured with the first DOF.

Aspect 167: The apparatus of any of aspects 165-166, where receiving the indication of the set of candidate beams for communicating with the UE is configured to cause the apparatus to: receive an indication of a TCI state corresponding to the port configured with the first DOF.

Aspect 168: The apparatus of any of aspects 161-167, where communicating with the UE via the at least one of the set of assigned beams using the at least one of the set of candidate beams is configured to cause the apparatus to: transmit, to the UE, a downlink transmission via the at least one of the set of assigned beams using the at least one of the set of candidate beams.

Aspect 169: The apparatus of any of aspects 161-168, where communicating with the UE via the at least one of the set of assigned beams using the at least one of the set of candidate beams is configured to cause the apparatus to: receive, from the UE, an uplink transmission via the at least one of the set of assigned beams using the at least one of the set of candidate beams.

Aspect 170: The apparatus of any of aspects 161-169, where communicating with the UE via the at least one of the set of assigned beams using the at least one of the set of candidate beams is configured to cause the apparatus to: communicate with the UE according to a DC deployment or a CA deployment.

Aspect 171: The apparatus of any of aspects 161-170, where the controller is further configured to cause the apparatus to: receive an indication of the plurality of bands over which the UE is capable of communicating with the one or more cells.

Aspect 172: The apparatus of any of aspects 161-171, where: the first cell communicates with the UE in a CA deployment; and the one or more cells include at least a PCell and an SCell.

Aspect 173: The apparatus of any of aspects 161-171, where: the first cell communicates with the UE in a DC deployment; and the one or more cells include at least a PCell and a PSCell.

Aspect 174: The apparatus of any of aspects 161-173, where: the plurality of bands include ultra-wideband frequency bands.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some examples, the actions recited in the claims can be performed in a different order and still achieve desirable results.

What is claimed is:

1. An apparatus for wireless communication at a user equipment (UE), comprising:
a first interface configured to:
obtain an indication of a first default operating frequency of one or more cells, the one or more cells operating over a plurality of bands;
wherein the first interface or a second interface is configured to:
output an indication of a set of candidate beams for communicating with the one or more cells based at least in part on a mismatch between the first default operating frequency of the one or more cells and a second default operating frequency associated with the UE;
obtain an indication of a set of assigned beams for communicating with the one or more cells in response to the outputted indication of the set of candidate beams; and
communicate with the one or more cells over the plurality of bands using the set of assigned beams.

2. The apparatus of claim 1, wherein outputting the indication of the set of candidate beams for communicating with the one or more cells further comprises:
outputting the indication of the set of candidate beams based at least in part on the mismatch between the first default operating frequency of the one or more cells and the second default operating frequency associated with the UE being within a threshold mismatch.

3. The apparatus of claim 1, wherein outputting the indication of the set of candidate beams for communicating with the one or more cells further comprises:

outputting an indication of the mismatch between the first default operating frequency of the one or more cells and the second default operating frequency associated with the UE.

4. The apparatus of claim 1, wherein outputting the indication of the set of candidate beams for communicating with the one or more cells further comprises:
outputting the indication of the set of candidate beams for communicating with the one or more cells based at least in part on an out-of-band emission associated with the set of candidate beams satisfying a threshold on out-of-band emissions.

5. The apparatus of claim 1, wherein obtaining the indication of the first default operating frequency of the one or more cells further comprises:
obtaining an indication that a port of the one or more cells is configured with the first default operating frequency.

6. The apparatus of claim 5, wherein the first interface or the second interface is further configured to:
obtain, at an antenna module of the UE configured with the second default operating frequency, a downlink reference signal via a beam of the set of candidate beams from the port configured with the first default operating frequency, wherein outputting the indication of the set of candidate beams is based at least in part on obtaining the downlink reference signal via the beam from the port configured with the first default operating frequency at the antenna module of the UE configured with the second default operating frequency.

7. The apparatus of claim 5, wherein outputting the indication of the set of candidate beams for communicating with the one or more cells further comprises:
outputting an indication of a transmission configuration indicator (TCI) state corresponding to the port configured with the first default operating frequency.

8. The apparatus of claim 1, wherein communicating with the one or more cells using the set of assigned beams further comprises:
obtaining a downlink transmission from at least one of the one or more cells via at least one of the set of candidate beams using at least one of the set of assigned beams.

9. The apparatus of claim 1, wherein communicating with the one or more cells using the set of assigned beams further comprises:
outputting an uplink transmission to at least one of the one or more cells via at least one of the set of candidate beams using at least one of the set of assigned beams.

10. The apparatus of claim 9, further comprising:
one or more processing components configured to cause the apparatus to:
select a set of antenna elements based at least in part on a maximum permissible exposure (MPE) threshold, a bandwidth or component cost differential between a power amplifier and a low noise amplifier on an uplink path and a downlink path, a power threshold on either the uplink path or the downlink path, or any combination thereof, wherein the at least one of the set of assigned beams is based at least in part on the set of antenna elements.

11. The apparatus of claim 1, wherein communicating with the one or more cells over the plurality of bands using the set of assigned beams further comprises:
communicating with the one or more cells according to a dual-connectivity (DC) deployment or a carrier-aggregation (CA) deployment.

12. The apparatus of claim 1, wherein the first interface or the second interface is further configured to:
output an indication of the plurality of bands over which the UE is capable of communicating with the one or more cells.

13. The apparatus of claim 1, wherein:
the UE operates in a carrier-aggregation (CA) deployment; and
the one or more cells comprise at least a primary cell (PCell) and a secondary cell (SCell).

14. The apparatus of claim 1, wherein:
the UE operates in a dual-connectivity (DC) deployment; and
the one or more cells comprise at least a primary cell (PCell) and a primary secondary cell (PSCell).

15. The apparatus of claim 1, wherein the plurality of bands comprises ultra-wideband frequency bands.

16. An apparatus for wireless communication at a first cell, comprising:
a first interface configured to:
output, to a user equipment (UE), an indication of a first default operating frequency of one or more cells, the one or more cells operating over a plurality of bands;
wherein the first interface or a second interface is configured to:
obtain, from the UE, an indication of a set of candidate beams for communicating with the UE based at least in part on a mismatch between the first default operating frequency of the one or more cells and a second default operating frequency associated with the UE;
output, to the UE, an indication of a set of assigned beams for the UE to communicate with the one or more cells in response to the obtained indication of the set of candidate beams; and
communicate with the UE via at least one of the set of assigned beams using at least one of the set of candidate beams.

17. The apparatus of claim 16, wherein obtaining the indication of the set of candidate beams for communicating with the UE further comprises:
obtaining the indication of the set of candidate beams based at least in part on the mismatch between the first default operating frequency of the one or more cells and the second default operating frequency associated with the UE being within a threshold mismatch.

18. The apparatus of claim 16, wherein obtaining the indication of the set of candidate beams for communicating with the UE further comprises:
obtaining the indication of the set of candidate beams for communicating with the UE based at least in part on an out-of-band emission associated with the set of candidate beams satisfying a threshold on out-of-band emissions.

19. A method for wireless communication at a user equipment (UE), comprising:
receiving an indication of a first default operating frequency of one or more cells, the one or more cells operating over a plurality of bands;
transmitting an indication of a set of candidate beams for communicating with the one or more cells based at least in part on a mismatch between the first default operating frequency of the one or more cells and a second default operating frequency associated with the UE;
receiving an indication of a set of assigned beams for communicating with the one or more cells in response to the transmitted indication of the set of candidate beams; and communicating with the one or more cells over the plurality of bands using the set of assigned beams.

20. The method of claim 19, wherein transmitting the indication of the set of candidate beams for communicating with the one or more cells comprises:
transmitting the indication of the set of candidate beams based at least in part on the mismatch between the first default operating frequency of the one or more cells and the second default operating frequency associated with the UE being within a threshold mismatch.

21. The method of claim 19, wherein transmitting the indication of the set of candidate beams for communicating with the one or more cells comprises:
transmitting an indication of the mismatch between the first default operating frequency of the one or more cells and the second default operating frequency associated with the UE.

22. The method of claim 19, wherein transmitting the indication of the set of candidate beams for communicating with the one or more cells comprises:
transmitting the indication of the set of candidate beams for communicating with the one or more cells based at least in part on an out-of-band emission associated with the set of candidate beams satisfying a threshold on out-of-band emissions.

23. The method of claim 19, wherein receiving the indication of the first default operating frequency of the one or more cells comprises:
receiving an indication that a port of the one or more cells is configured with the first default operating frequency.

24. The method of claim 19, wherein communicating with the one or more cells using the set of assigned beams comprises:
receiving a downlink transmission from at least one of the one or more cells via at least one of the set of candidate beams using at least one of the set of assigned beams.

25. The method of claim 19, wherein communicating with the one or more cells using the set of assigned beams comprises:
transmitting an uplink transmission to at least one of the one or more cells via at least one of the set of candidate beams using at least one of the set of assigned beams.

26. The method of claim 19, wherein communicating with the one or more cells over the plurality of bands using the set of assigned beams comprises:
communicating with the one or more cells according to a dual-connectivity (DC) deployment or a carrier-aggregation (CA) deployment.

27. The method of claim 19, wherein:
the UE operates in a carrier-aggregation (CA) deployment; and
the one or more cells comprise at least a primary cell (PCell) and a secondary cell (SCell).

28. The method of claim 19, wherein:
the UE operates in a dual-connectivity (DC) deployment; and
the one or more cells comprise at least a primary cell (PCell) and a primary secondary cell (PSCell).

29. A method for wireless communication at a first cell, comprising:
transmitting, to a user equipment (UE), an indication of a first default operating frequency of one or more cells, the one or more cells operating over a plurality of bands;
receiving, from the UE, an indication of a set of candidate beams for communicating with the UE based at least in part on a mismatch between the first default operating frequency of the one or more cells and a second default operating frequency associated with the UE;
transmitting, to the UE, an indication of a set of assigned beams for the UE to communicate with the one or more cells in response to the received indication of the set of candidate beams; and
communicating with the UE via at least one of the set of assigned beams using at least one of the set of candidate beams.

30. The method of claim 29, wherein receiving the indication of the set of candidate beams for communicating with the UE comprises:
receiving the indication of the set of candidate beams based at least in part on the mismatch between the first default operating frequency of the one or more cells and the second default operating frequency associated with the UE being within a threshold mismatch, or based at least in part on an out-of-band emission associated with the set of candidate beams satisfying a threshold on out-of-band emissions.

* * * * *